United States Patent
Jeong et al.

(10) Patent No.: US 12,471,183 B2
(45) Date of Patent: Nov. 11, 2025

(54) METHOD AND APPARATUS FOR INTER-UE COORDINATION IN SL CA

(71) Applicant: Samsung Electronics Co., Ltd., Suwon-si (KR)

(72) Inventors: Kyeongin Jeong, Allen, TX (US); Shiyang Leng, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 18/332,512

(22) Filed: Jun. 9, 2023

(65) Prior Publication Data

US 2024/0015848 A1 Jan. 11, 2024

Related U.S. Application Data

(60) Provisional application No. 63/389,135, filed on Jul. 14, 2022, provisional application No. 63/359,140, filed on Jul. 7, 2022.

(51) Int. Cl.
*H04W 76/38* (2018.01)
*H04L 1/1812* (2023.01)
(Continued)

(52) U.S. Cl.
CPC ........... *H04W 76/38* (2018.02); *H04L 1/1812* (2013.01); *H04L 5/0098* (2013.01); *H04W 72/25* (2023.01);
(Continued)

(58) Field of Classification Search
CPC ............ H04W 36/0069–00692; H04W 72/02; H04W 72/04; H04W 72/12; H04W 72/20; H04W 72/25; H04W 72/40; H04W 76/14; H04W 76/23; H04W 76/38; H04L 5/001; H04L 5/0091–0098
See application file for complete search history.

(56) References Cited

U.S. PATENT DOCUMENTS 9,949,240 B2 * 4/2018 Takano ................. H04L 5/0098
12,262,435 B2 * 3/2025 Orsino ................. H04W 76/19
(Continued)

FOREIGN PATENT DOCUMENTS

WO 2021147959 A1 7/2021
WO 2021154030 A1 8/2021

OTHER PUBLICATIONS

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
(Continued)

*Primary Examiner* — Brendan Y Higa

(57) ABSTRACT

Methods and apparatuses for inter-user equipment (UE) coordination in sidelink (SL) carrier aggregation (CA) in a wireless communication system. A method of operating a UE includes: receiving, from a base station (BS), configuration information about multiple SL carriers for a SL CA operation; determining whether a SL radio link failure (RLF) is detected for a SL carrier among the multiple SL carriers; and starting a timer for the SL carrier based on a determination that the SL RLF is detected, wherein an activation or a deactivation of the SL carrier is determined based on a status of the timer.

20 Claims, 12 Drawing Sheets

(51) Int. Cl.

| | | |
|---|---|---|
| *H04L 5/00* | (2006.01) | |
| *H04W 72/25* | (2023.01) | |
| *H04W 72/40* | (2023.01) | |
| *H04W 76/14* | (2018.01) | |
| *H04W 76/23* | (2018.01) | |
| *H04W 92/18* | (2009.01) | |

(52) U.S. Cl.
CPC .......... *H04W 72/40* (2023.01); *H04W 76/14* (2018.02); *H04W 76/23* (2018.02); *H04W 92/18* (2013.01)

(56) References Cited

U.S. PATENT DOCUMENTS

| | | | | |
|---|---|---|---|---|
| 2011/0170422 | A1* | 7/2011 | Hu | H04W 36/00692 370/242 |
| 2015/0365872 | A1* | 12/2015 | Dudda | H04W 36/305 455/436 |
| 2016/0338137 | A1* | 11/2016 | Mishra | H04W 36/00692 |
| 2019/0364468 | A1* | 11/2019 | Yerramalli | H04W 36/305 |
| 2021/0136856 | A1 | 5/2021 | Tseng et al. | |
| 2021/0185667 | A1* | 6/2021 | Takano | H04W 84/10 |
| 2022/0150730 | A1* | 5/2022 | Freda | H04L 1/188 |
| 2022/0190966 | A1 | 6/2022 | Hosseini et al. | |
| 2023/0128455 | A1 | 4/2023 | Kang et al. | |
| 2023/0397268 | A1* | 12/2023 | Hanif | H04W 76/14 |
| 2025/0016638 | A1* | 1/2025 | Wang | H04W 76/14 |

OTHER PUBLICATIONS

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

"5G; NR; NR and NG-RAN Overall description; Stage-2 (3GPP TS 38.300 version 17.0.0 Release 17)", ETSI TS 138 300 V17.0.0, May 2022, 207 pages.

"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.

"Universal Mobile Telecommunications System (UMTS); LTE; Proximity-based services (ProSe); Stage 2 (3GPP TS 23.303 version 17.0.0 Release 17)", ETSI TS 123 303 V17.0.0, May 2022, 133 pages.

"5G; Architecture enhancements for 5G System (5GS) to support Vehicle-to-Everything (V2X) services (3GPP TS 23.287 version 17.2.0 Release 17)", ETSI TS 123 287 V17.2.0, May 2022, 62 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages.

"3rd Generation Partnership Project; Technical Specification Group Radio Access Network; NR; Physical layer procedures for data (Release 17)", 3GPP TS 38.214 V17.1.0, Mar. 2022, 225 pages.

International Search Report and Written Opinion issued Oct. 6, 2023 regarding International Application No. PCT/KR2023/009641, 6 pages.

Mediatek Inc et al., "Correction on SL DRX configuration for SL Relay", 3GPP TSGRAN# 96, RP-221563, May 2022, 18 pages.

Extended European Search Report issued Jul. 3, 2025 regarding Application No. 23835880.8, 6 pages.

ZTE et al., "Consideration on AS level sidelink management", 3GPP TSG RAN WG2 Meeting #105, R2-1900379, Feb. 2019, 5 pages.

\* cited by examiner

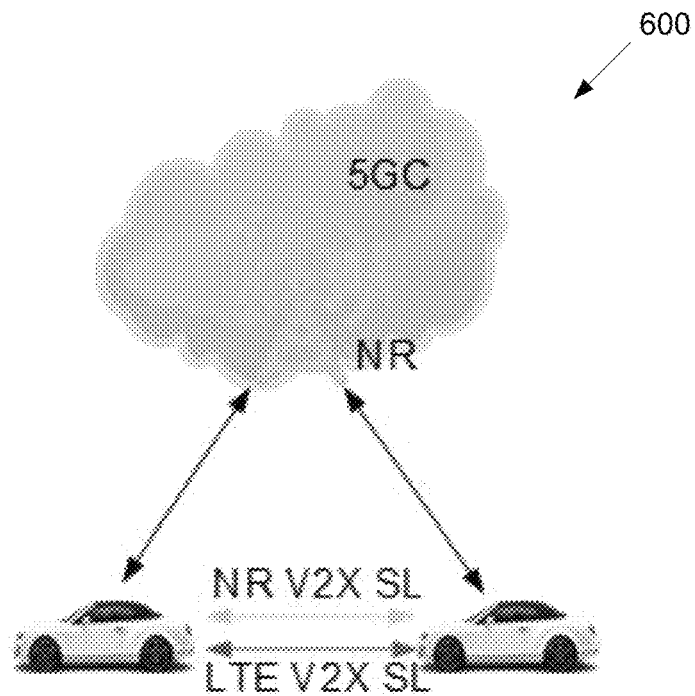
FIG. 6
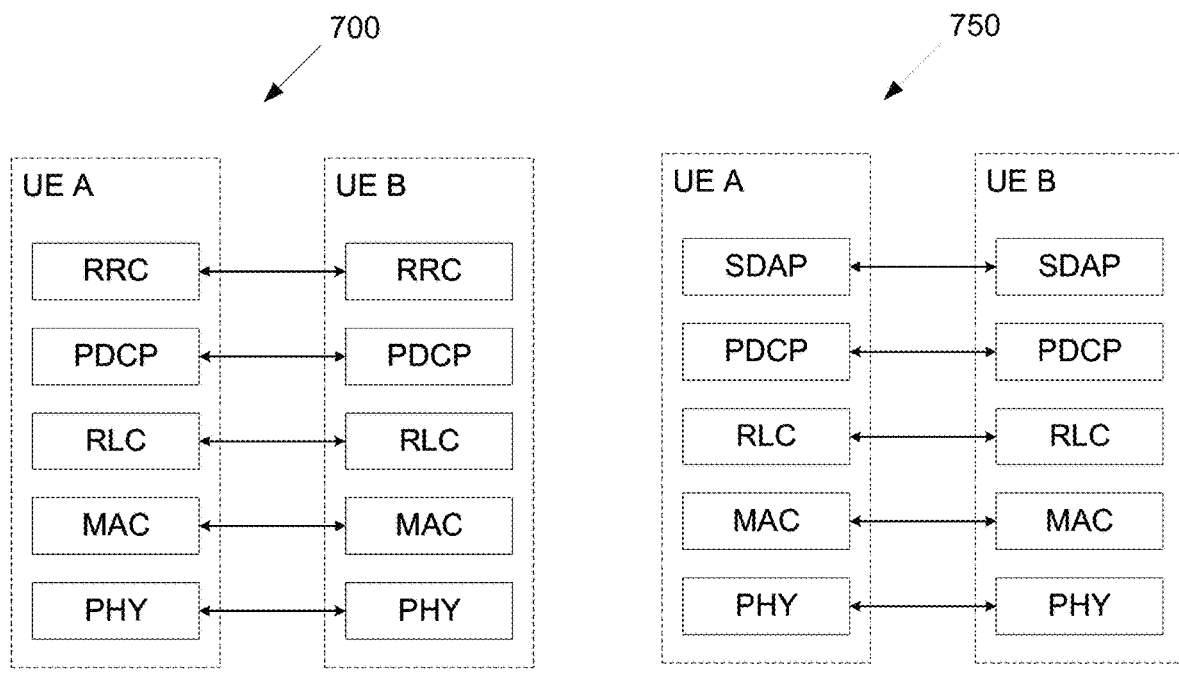
FIG. 7A
FIG. 7B

METHOD AND APPARATUS FOR INTER-UE COORDINATION IN SL CA

CROSS-REFERENCE TO RELATED APPLICATIONS AND CLAIM OF PRIORITY

The present application claims priority to U.S. Provisional Patent Application No. 63/359,140, filed on Jul. 7, 2022, and U.S. Provisional Patent Application No. 63/389,135, filed on Jul. 14, 2022. The contents of the above-identified patent documents are incorporated herein by reference.

TECHNICAL FIELD

The present disclosure relates generally to wireless communication systems and, more specifically, the present disclosure relates to inter-user equipment (UE) coordination in sidelink (SL) carrier aggregation (CA) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to inter-UE coordination in SL CA in a wireless communication system.

In one embodiment, a UE is provided. The UE comprises a transceiver configured to receive, from a base station (BS), configuration information about multiple SL carriers for a SL CA operation. The UE further comprises a processor operably coupled to the transceiver, the processor configured to: determine whether a SL radio link failure (RLF) is detected for a SL carrier among the multiple SL carriers, and start a timer for the SL carrier based on a determination that the SL RLF is detected, wherein an activation or a deactivation of the SL carrier is determined based on a status of the timer.

In another embodiment, a method of a UE is provided. The method comprises: receiving, from a base station (BS), configuration information about multiple sidelink (SL) carriers for a SL carrier aggregation (CA) operation; determining whether a SL radio link failure (RLF) is detected for a SL carrier among the multiple SL carriers; and starting a timer for the SL carrier based on a determination that the SL RLF is detected, wherein an activation or a deactivation of the SL carrier is determined based on a status of the timer.

In yet another embodiment, a BS is provided. The BS comprises a processor configured to generate configuration information about multiple SL carriers. The BS further comprises a transceiver operably coupled to the processor, the transceiver configured to transmit, to a UE, the configuration information about the multiple SL carriers for a SL CA operation, wherein: a detection of SL RLF is determined based on the configuration information, for a SL carrier among the multiple SL carriers, and a timer for the SL carrier is started based on a determination when the SL RLF is detected, wherein an activation or a deactivation of the SL carrier being determined based on a status of the timer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example of V2X communication over SL according to embodiments of the present disclosure;

FIGS. 7A and 7B illustrate an example of SL control and user planes radio protocol stack according to embodiments of the present disclosure;

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.321 v17.0.0, "NR; Medium Access Control (MAC) protocol specification"; 3GPP TS 38.331 v17.0.0, "NR Radio Resource Control (RRC) protocol specification"; 3GPP TS 38.300 v17.0.0, "NR and NG-RAN Overall Description stage 2"; 3GPP TR 38.885 v16.0.0, "Study on NR Vehicle-to-Everything (V2X)"; 3GPP TS 23.303 v17.0.0, "Proximity-based services (ProSe), stage 2"1 and 3GPP TS 23.287 v17.2.0, "Architecture enhancements for 5G System (5GS) to support Vehicle-to-Everything (V2X) services."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
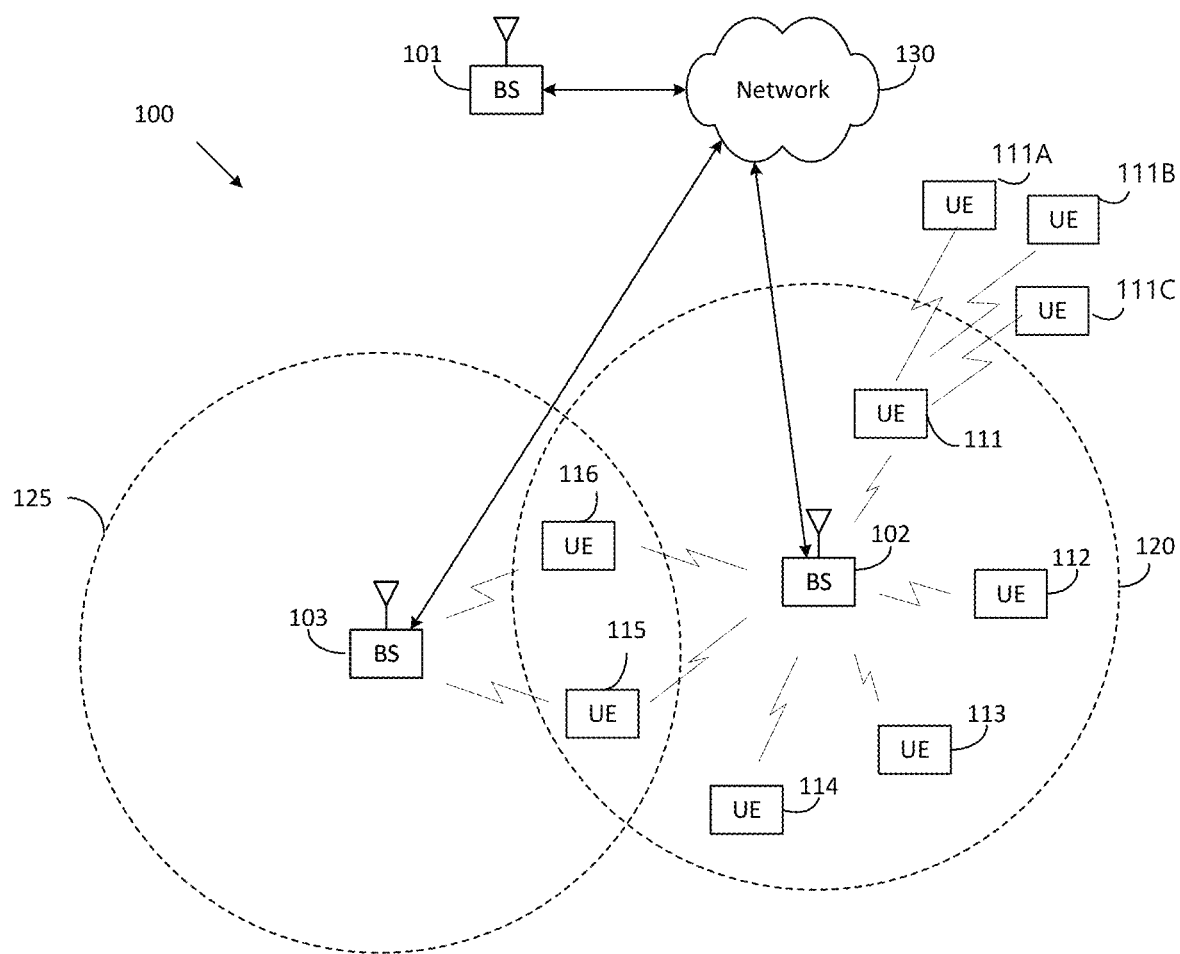
FIG. 1 illustrates an example of wireless network according to embodiments of the present disclosure.
Figure 2:
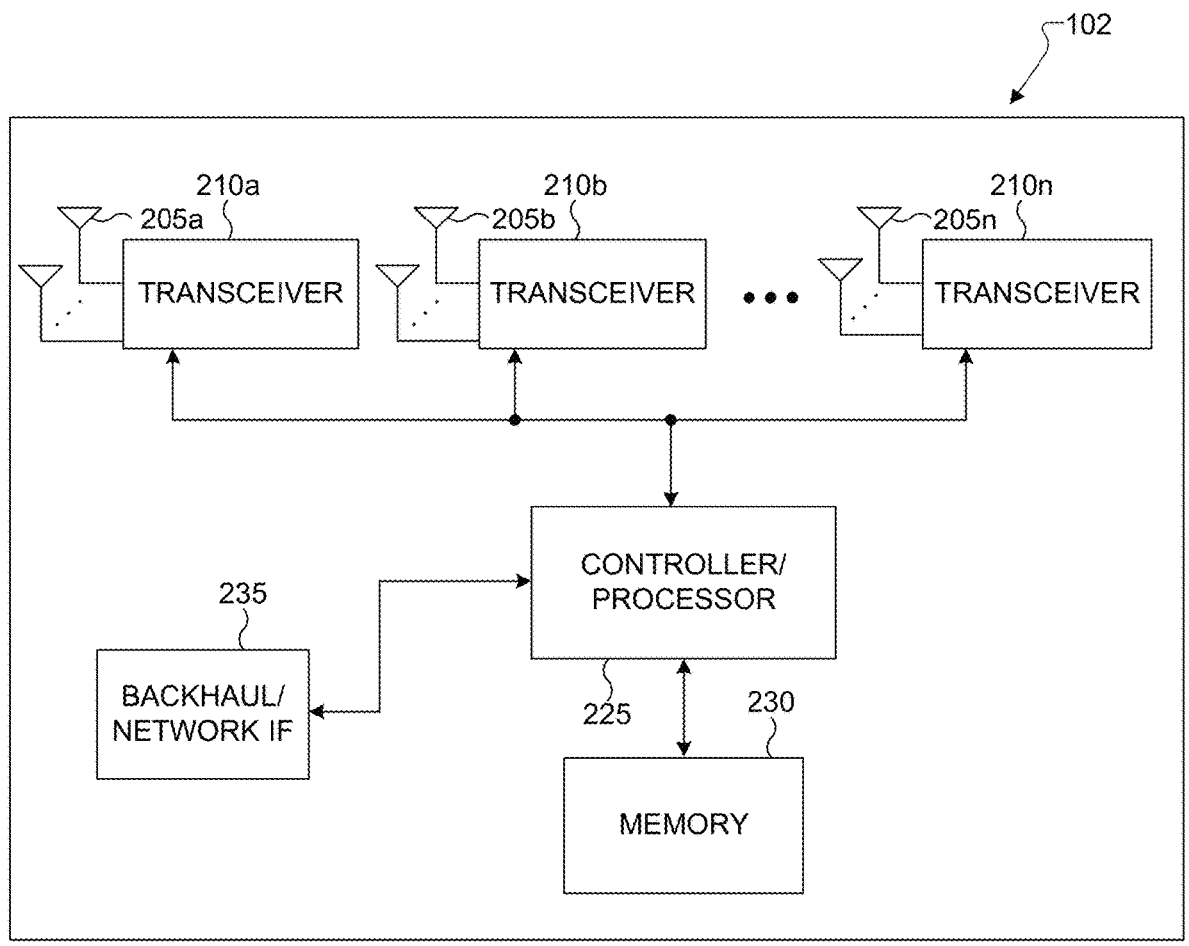
FIG. 2 illustrates an example of gNB according to embodiments of the present disclosure.
Figure 3:
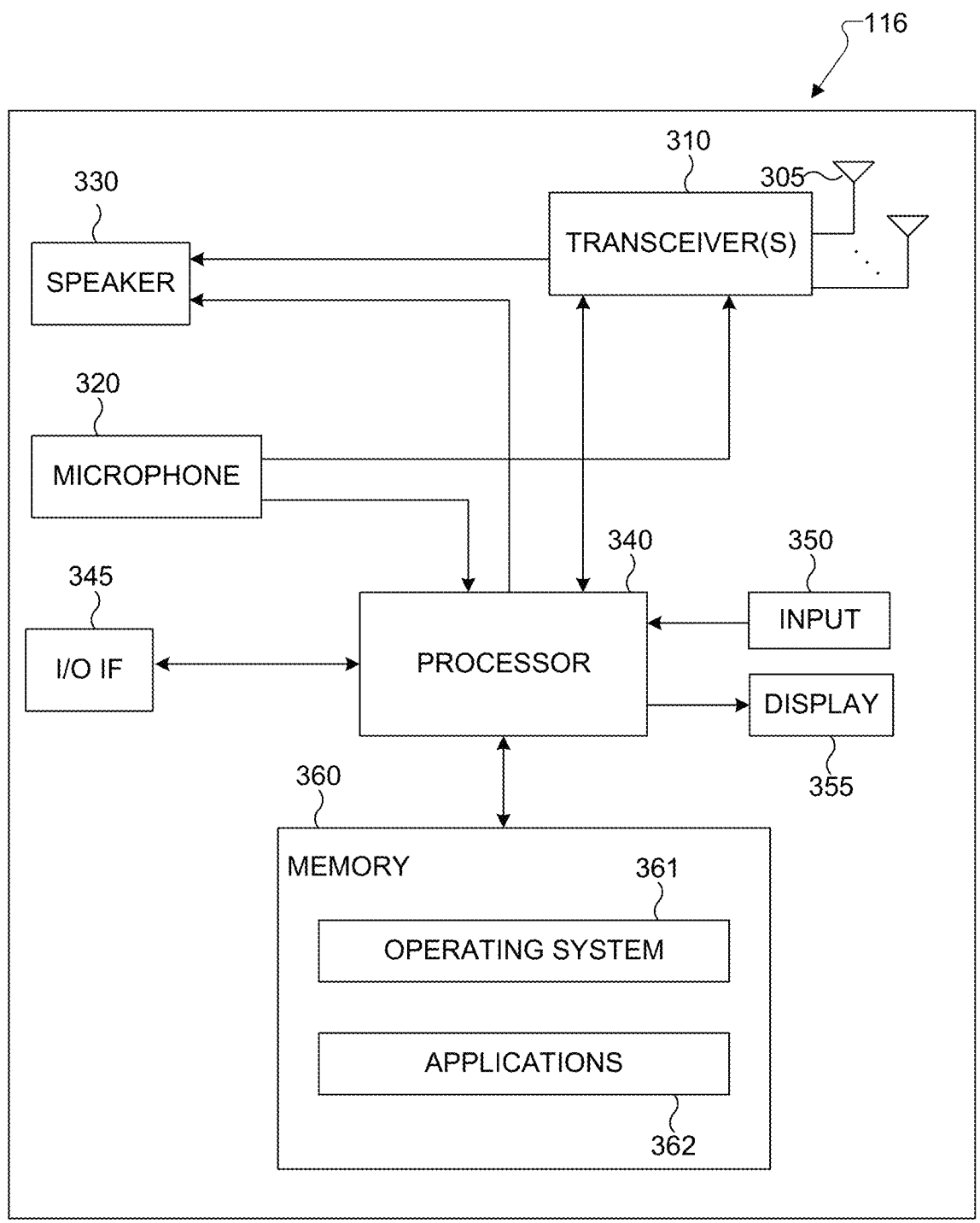
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for inter-UE coordination in SL CA in a wireless communication system. In certain embodiments, and one or more of the gNBs 101-103 includes circuitry, programing, or a combination thereof, to support inter-UE coordination in SL CA in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes, for example, to support inter-UE coordination in SL CA in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for inter-UE coordination in SL CA in a wireless communication system. The processor 340 can move data into or out of the memory 360 as required by an executing process. In some embodiments, the processor 340 is configured to execute the applications 362 based on the OS 361 or in response to signals received from gNB s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
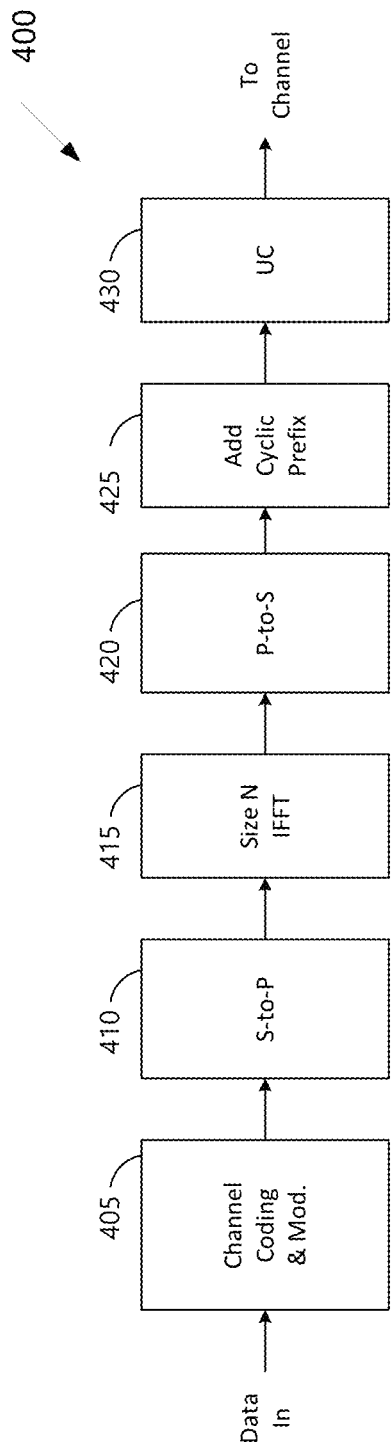
FIGS. 4 and 5 illustrate example of wireless transmit and receive paths according to this disclosure.
Figure 5:
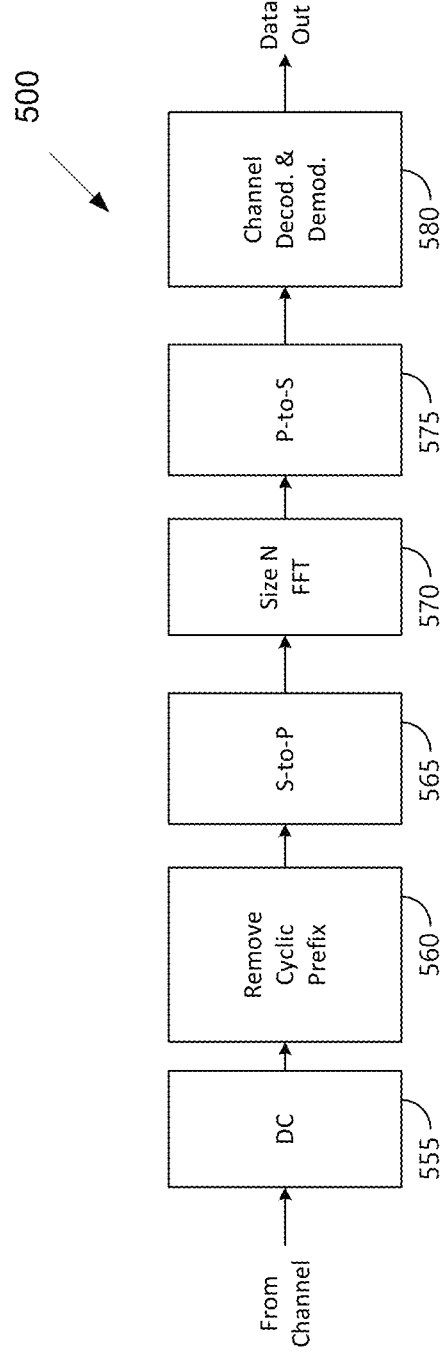

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support inter-UE coordination in SL CA in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, new radio access technology (NR) has been specified as 5G wireless communication. One of NR features is vehicle-to-everything (V2X).

FIG. 6 illustrates an example of V2X communication over SL 600 according to embodiments of the present disclosure. An embodiment of the V2X communication over SL 600 shown in FIG. 6 is for illustration only.

FIG. 6 describes the example scenario of vehicle to vehicle communication. Two or multiple vehicles can transmit and receive data/control over direct link/interface between vehicles. The direct link/interface between vehicles or between vehicle and other things is named as SL in 3GPP, so "SL communication" is also commonly used instead of "V2X communication."

Note that FIG. 6 describes the scenario where the vehicles still can communicate with gNB in order to acquire SL resource, SL radio bearer configurations, etc., however it is also possible even without interaction with gNB, vehicles still communicate with each other over SL. In the case, SL resource, SL radio bearer configuration, etc. are preconfigured (e.g., via V2X server or any other core network entity).

One of the main difference compared to an uplink (UL) that is a link from the UE to the gNB is the resource allocation mechanism for transmission. In UL, the resource for transmission is allocated by the gNB, however in SL, the UE itself selects a resource within the SL resource pool, which is configured by the gNB and selected by the UE if multiple SL resource pools are configured, based on UE's channel sensing result and the required amount of resources for data/control transmission.

For SL communication, the radio interface L1/L2/L3 (Layer 1/Layer 2/Layer 3) protocols comprises of physical protocol (PHY), which is specified in 3GPP standards TS 38.211, 38.212, 38.213, 38.214, and 38.215), medium access control (MAC), which is specified in 3GPP standards TS 38.321), radio link control (RLC), which is specified in 3GPP standards TS 38.322), packet data convergence protocol (PDCP), which is specified in 3GPP standards TS 38.323), radio resource control (RRC), which is specified in 3GPP standards TS 38.331, and service data adaptation protocol (SDAP), which is specified in 3GPP standards TS 37.324).

FIGS. 7A and 7B illustrate an example of SL control and user planes radio protocol stack 700 and 750 according to embodiments of the present disclosure. An embodiment of the SL control and user planes radio protocol stack 700 and 750 shown in FIGS. 7A and 7B are for illustration only.

FIG. 7A describes the example of SL control plane radio protocol stack (for SL-RRC) and FIG. 7B describes the example of SL user plane data radio protocol stack for NR SL communication.

Physical protocol layer handles physical layer signals/ channels and physical layer procedures (e.g., physical layer channel structure, physical layer signal encoding/decoding, SL power control procedure, SL cannel status information (CSI) related procedure).

Main physical SL channels and signals are defined as follow: (1) physical sidelink control channel (PSCCH) indicates resource and other transmission parameters used by a UE for PSSCH; (2) physical sidelink shared channel (PSSCH) transmits the TBs of data themselves and CSI feedback information, etc.; (3) physical sidelink feedback channel (PSFCH) transmits HARQ feedback over the sidelink from a UE which is an intended recipient of a PSSCH transmission to the UE which performed the transmission; (4) sidelink synchronization signal includes sidelink primary and sidelink secondary synchronization signals (S-PSS, S-SSS); and (5) physical sidelink broadcast channel (PSBCH) indicates the required essential system information for SL operations. MAC protocol layer performs packet filtering (e.g., determine whether the received packet is actually destined to the UE (based on the L2 source and destination ids in the MAC header), SL carrier/resource pool/resource within the resource pool (re)selection, priority handling between SL and UL for a given UE, SL logical channel prioritization, the corresponding packet multiplexing (e.g., multiplexing multiple MAC SDUs into a given MAC PDU) and SL HARQ retransmissions/receptions. RLC protocol layer performs RLC SDU segmentation/SDU reassembly, re-segmentation of RLC SDU segments, error correction through ARQ (only for AM data transfer).

PDCP protocol layer performs header compression/decompression, ciphering and/or integrity protection, duplication detection, re-ordering and in-order packet delivery to the upper layer and out-of-order packet delivery to the upper layer. RRC protocol layer performs transfer of a SL-RRC message, which is also named as PC5-RRC (PC5 indicates the reference point between UEs for SL communication), between peer UEs, maintenance and release of SL-RRC connection between two UEs, and detection of SL radio link failure for a SL-RRC connection. SDAP protocol layer performs mapping between a QoS (Quality of Service) flow and a SL data radio bearer. Note that the term SL-RRC or PC5-RRC is used in the present disclosure.

In 3GPP Rel-18, it is planned to introduce more enhanced features into SL communication and one of the candidate features is to enable carrier aggregation (CA) in SL communication. CA is a mechanism to transmit and/or receive control/data over multiple carriers. In Rel-17 SL communication, for SL Unicast (UC), PC5-RRC connection is established between two UEs. A PC5-RRC connection is a logical connection between two UEs for a pair of source and destination layer-2 IDs which is considered to be established after a corresponding PC5 unicast link is established as specified in 3GPP standard specification.

For each PC5-RRC connection of unicast, one sidelink SRB (i.e., SL-SRB0) is used to transmit the PC5-S message(s) before the PC5-S security has been established. One sidelink SRB (i.e., SL-SRB1) is used to transmit the PC5-S messages to establish the PC5-S security. One sidelink SRB (i.e., SL-SRB2) is used to transmit the PC5-S messages after the PC5-S security has been established, which is protected. One sidelink SRB (i.e., SL-SRB3) is used to transmit the PC5-RRC signalling, which is protected and only sent after the PC5-S security has been established. There is one-to-one correspondence between the PC5-RRC connection and the PC5 unicast link. A UE may have multiple PC5-RRC connections with one or more UEs for different pairs of source and destination layer-2 IDs. Separate PC5-RRC procedures and messages are used for a UE to transfer UE capability and sidelink configuration to the peer UE as specified in 3GPP standard specification.

Both peer UEs can exchange their own UE capability and sidelink configuration using separate bi-directional procedures in both sidelink directions. If SL RLF on the PC5-RRC connection is declared, UE releases the PC5-RRC connection. SL RLF can be detected in MAC based on HARQ feedback as specified in 3GPP standard specification.

The HARQ-based sidelink RLF detection procedure is used to detect Sidelink RLF based on a number of consecutive DTX on PSFCH reception occasions for a PC5-RRC connection.

RRC configures the following parameter to control HARQ-based Sidelink RLF detection: (1) sl-maxNumConsecutiveDTX.

The following UE variable is used for HARQ-based Sidelink RLF detection: (1) numConsecutiveDTX, which is maintained for each PC5-RRC connection.

The sidelink HARQ Entity shall (re-)initialize numConsecutiveDTX to zero for each PC5-RRC connection which has been established by upper layers, if any, upon establishment of the PC5-RRC connection or (re)configuration of sl-maxNumConsecutiveDTX.

TABLE 1 shows the HARQ-based Sidelink RLF detection as specified in 3GPP standard specification.

TABLE 1

HARQ-based Sidelink RLF detection

The Sidelink HARQ Entity shall for each PSFCH reception occasion associated to the PSSCH transmission:
1>    if PSFCH reception is absent on the PSFCH reception occasion:
  2>    increment numConsecutiveDTX by 1;
  2>    if numConsecutiveDTX reaches sl-maxNumConsecutiveDTX:
    3>    indicate HARQ-based Sidelink RLF detection to RRC.
1>    else:
  2>    re-initialize numConsecutiveDTX to zero.

Also, SL RLF can be detected in RRC if the following conditions, as shown in TABLE 2, are met, which is specified in 3GPP standard specification.

TABLE 2

Condition for the SL RLF

1>  upon indication from sidelink RLC entity that the maximum number of retransmissions for a specific destination has been reached; or
1>  upon T400 expiry for a specific destination; or
1>  upon integrity check failure indication from sidelink PDCP entity concerning SL-SRB2 or SL-SRB3 for a specific destination Once RRC detects SL RLF or RRC receives HARQ-based sidelink RLF detection from MAC, RRC performs the following operations as specified in 3GPP standard specification, as shown in TABLE 3.

TABLE 3

RRC operation

2>        consider sidelink radio link failure to be detected for this destination;
2>        release the DRBs of this destination, in according to sub-clause 5.8.9.1a.1;
2>        release the SRBs of this destination, in according to sub-clause 5.8.9.1a.3;
2>        discard the NR sidelink communication related configuration of this destination;
2>        reset the sidelink specific MAC of this destination;
2>        consider the PC5-RRC connection is released for the destination;
2>        indicate the release of the PC5-RRC connection to the upper layers for this destination (i.e., PC5 is unavailable);
2>        if UE is in RRC_CONNECTED:
   3>     perform the sidelink UE information for NR sidelink communication procedure, as specified in 5.8.3.3;
"perform the sidelink UE information for NR sidelink communication procedure, as specified in 5.8.3.3" is to inform the serving gNB of sidelink RLF corresponding to each SL UC link (or each destination UE id) as follow.
      4>     if a sidelink radio link failure or a sidelink RRC reconfiguration failure has been declared, according to clauses 5.8.9.3 and 5.8.9.1.8, respectively;
        5>    include sl-FailureList and set its fields as follows for each destination for which it reports the NR sidelink communication failure:
           6>    set sl-DestinationIdentity to the destination identity configured by upper layer for NR sidelink communication transmission;
           6>    if the sidelink RLF is detected as specified in sub-clause 5.8.9.3:
              7>   set sl-Failure as rlf for the associated destination for the NR sidelink communication transmission;
           6>    else if RRCReconfigurationFailureSidelink is received:
              7>   set sl-Failure as configFailure for the associated destination for the NR sidelink communication transmission.

Note that SL specific MAC reset is defined as shown in TABLE 4.

TABLE 4

SL specific MAC reset

If a Sidelink specific reset of the MAC entity is requested for a PC5-RRC connection by upper
layers, the MAC entity shall:
1>    flush the soft buffers for all Sidelink processes for all TB(s) associated to the PC5-RRC connection;
1>    consider all Sidelink processes for all TB(s) associated to the PC5-RRC connection as unoccupied;
1>    cancel, if any, triggered Scheduling Request procedure only associated to the PC5-RRC connection;
1>    cancel, if any, triggered Sidelink Buffer Status Reporting procedure only associated to the PC5-RRC connection;
1>    cancel, if any, triggered Sidelink CSI Reporting procedure associated to the PC5-RRC connection;
1>    stop (if running) all timers associated to the PC5-RRC connection;
1>    reset the numConsecutiveDTX associated to the PC5-RRC connection;
1>    initialize SBj for each logical channel associated to the PC5-RRC connection to zero.

Figure 8A:
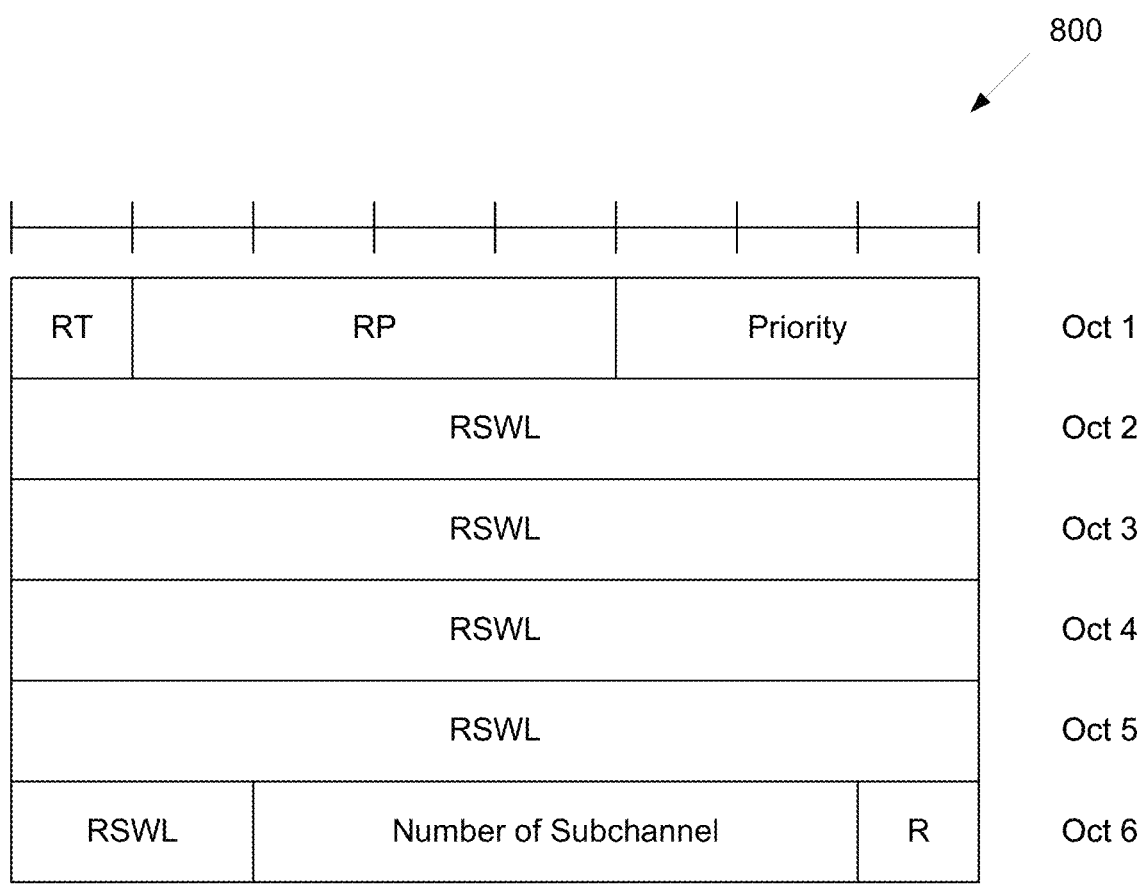
FIG. 8A illustrates an example of inter-UE coordination request MAC CE according to embodiments of the present disclosure.

FIG. 8A illustrates an example of inter-UE coordination request MAC CE 800 according to embodiments of the present disclosure. An embodiment of the inter-UE coordination request MAC CE 800 shown in FIG. 8A is for illustration only.

FIG. 8A shows IUC REQ MAC CE. IUC REQ MAC CE is identified by a MAC subheader with LCID. The priority of the IUC REQ MAC CE is fixed to "1."

It has a fixed size of 48 bits with following fields: (1) RT: if the value of sl-DetermineResourceType (as specified in 3GPP standard specification) is set to "ueb," this field indicates the resource set type, i.e., preferred resource set or non-preferred resource set, as the codepoint value of the SCI format 2-C resourceSetType field as specified in 3GPP standard specification. This field is ignored if the value of sl-DetermineResourceType is set to "uea"; (2) RP: this field indicates the resource reservation period, as the codepoint value of the SCI format 2-C resourceReservationPeriod field as specified in 3GPP standard specification. The length of the field is 4 bits. If the length of resourceReservationPeriod field in SCI format 2-C as specified in 3GPP standard specification is shorter than 4 bit, this field contains resourceReservationPeriod field using the LSB bits; (3) Priority: this field indicates the priority, as the codepoint value of the SCI format 2-C priority field as specified in 3GPP standard specification.

The length of the field is 3 bits; (4) RSWL: this field indicates resource selection window location, as the codepoint value of the SCI format 2-C resourceSelectionWindowLocation field as specified in 3GPP standard specification. The length of the field is 34 bits. If the length of resourceSelectionWindowLocation field in SCI format 2-C as specified in 3GPP standard specification is shorter than 34 bit, this field contains resourceSelectionWindowLocation field using the LSB bits; (5) a number of subchannel: this field indicates the number of subchannels, as the codepoint value of the SCI format 2-C numberOfSubchannel field as specified in 3GPP standard specification. The length of the field is 5 bits. If the length of numberOfSubchannel field in SCI format 2-C as specified in 3GPP standard specification is shorter than 5 bit, this field contains numberOfSubchannel field using the LSB bits; and (6) R: reserved bit, set to 0.

Figure 8B:
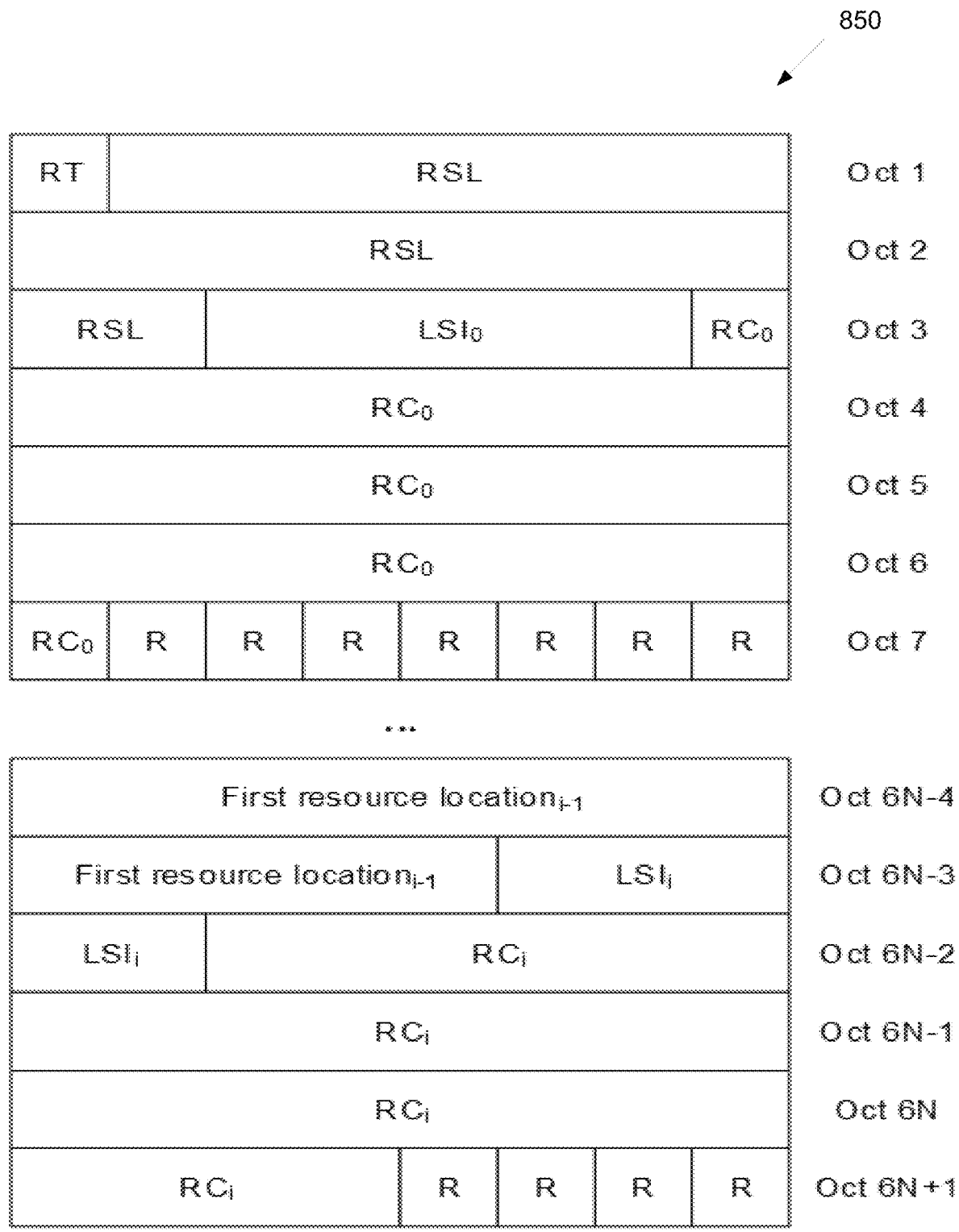
FIG. 8B illustrates an example of inter-UE coordination information MAC CE according to embodiments of the present disclosure.

FIG. 8B illustrates an example of inter-UE coordination information MAC CE 850 according to embodiments of the present disclosure. An embodiment of the inter-UE coordination information MAC CE 850 shown in FIG. 8B is for illustration only.

FIG. 8B shows IUC MAC CE. IUC INFO MAC CE is identified by a MAC subheader with LCID. The priority of the IUC INFO MAC CE is fixed to "1."

It has a variable size with following fields: (1) RT: this field indicates the resource set type, i.e., preferred resource set/non-preferred resource set, as the codepoint value of the SCI format 2-C resourceSetType field as specified in 3GPP standard specification; (2) RSL: this field indicates the location of reference slot, as the codepoint value of the SCI format 2-C referenceSlotLocation field as specified in 3GPP standard specification. The length of the field is 17 bits. If the length of referenceSlotLocation field in SCI format 2-C as specified in 3GPP standard specification is shorter than 17 bit, this field contains referenceSlotLocation field using the LSB bits; (3) $LSI_i$: this field indicates lowest subchannel indices for the first resource location of each TRIV, as the codepoint value of the SCI format 2-C lowestIndices field as specified in 3GPP standard specification. $LSI_0$ indicates lowest subchannel indices for the first resource location of TRIV within the first resource combination, $LSI_1$ indicates lowest subchannel indices for the first resource location of TRIV within the second resource combination and so on. The length of the field is 5 bits.

If the length of lowestIndices field in SCI format 2-C as specified in 3GPP standard specification is shorter than 5 bit, this field contains lowestIndices field using the LSB bits; (4) $RC_i$: this field indicates resource combination, as the codepoint value of the SCI format 2-C resourceCombination field as specified in. $RC_0$ indicates the first resource combination, $RC_1$ indicates the second resource combination and so on. The length of the field is 26 bits. If the length of resource-Combination field in SCI format 2-C as specified in 3GPP standard specification is shorter than 26 bit, this field contains resourceCombination field using the LSB bits; (5) first resource $location_{i-1}$: this field indicates first resource location, as the codepoint value of the SCI format 2-C firstResourceLocation field as specified in 3GPP standard specification. First resource $location_0$ indicates the first resource location for the second resource combination. First resource $location_1$ indicates the first resource location for the third resource combination and so on. The length of the field is 13 bits. If the length of firstResourceLocation field in SCI format 2-C as specified in 3GPP standard specification is shorter than 13 bit, this field contains firstResourceLocation field using the LSB bits; and (6) R: reserved bit, set to 0.

Figure 9:
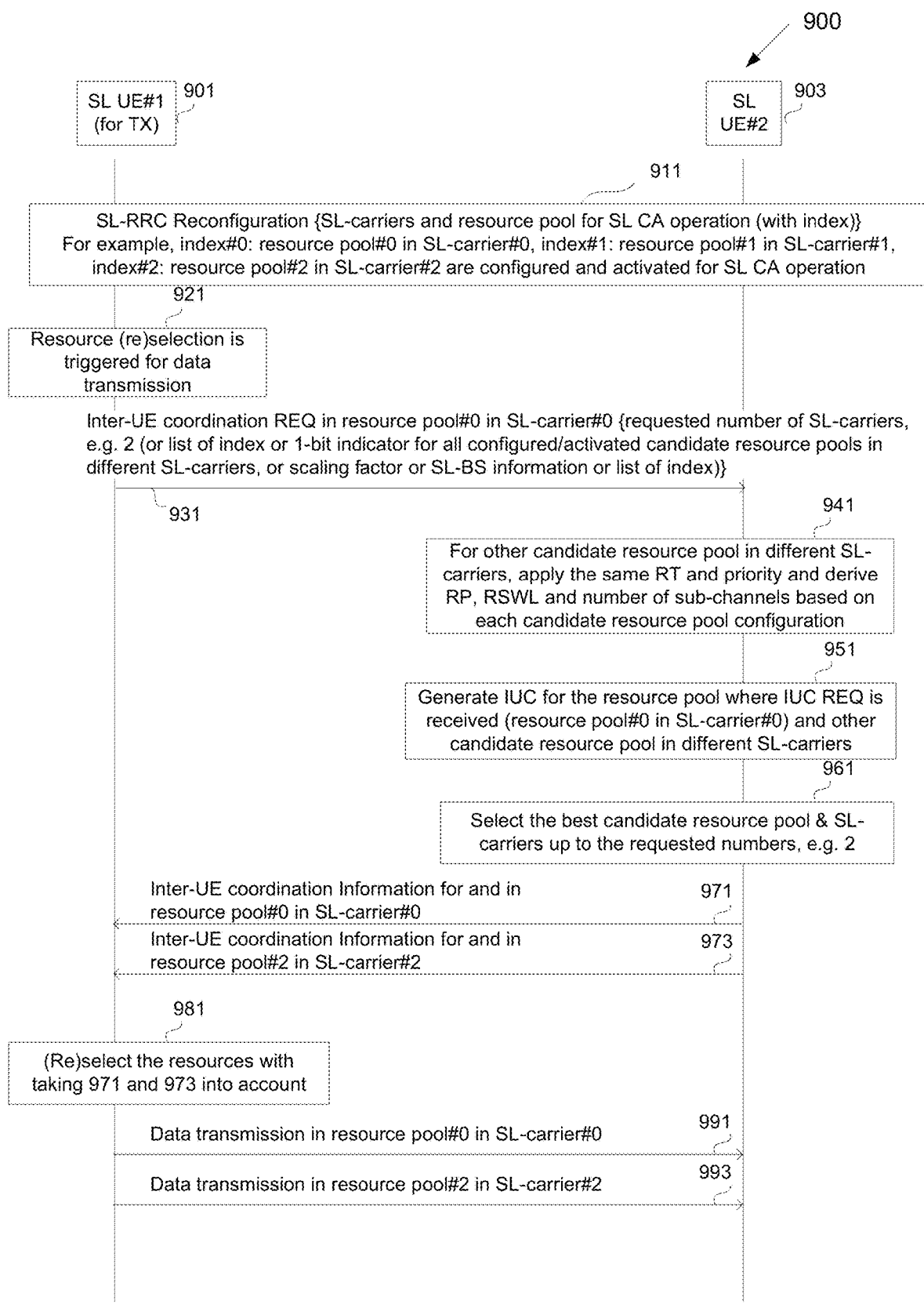
FIG. 9 illustrates signaling flows for an enhanced inter-UE coordination based resource allocation according to embodiments of the present disclosure.

FIG. 9 illustrates signaling flows 900 for an enhanced inter-UE coordination based resource allocation according to embodiments of the present disclosure. The signaling flows 900 may be performed between UEs (e.g., one of UEs 111 to 116 and one of UEs 111A to 111C as illustrated in FIG. 1). An embodiment of the signaling flows 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 describes an example of a resource allocation mechanism in SL CA. 901 indicates a SL UE #1 who configured for SL transmission and intends to transmit data/control over SL so the UE sends inter-UE coordination request. 903 indicates a SL UE #2 who can provide inter-UE coordination information to the SL UE #1 as a response to the SL UE #1's inter-UE coordination request. 903 can be the receiver UE of the data/control to be transmitted by the SL UE #1 or any other UE who can provide inter-UE coordination information. Here it is assumed the SL UE #2 is the SL UE #1's peer UE for SL unicast communication. The SL UE #1 configures multiple SL-carriers and SL resource pools for SL CA operation with the SL UE #2 by using SL-RRC reconfiguration procedure (911).

It may be assumed that SL resource pool #0 in SL-carrier #0 (with index #0), SL resource pool #1 in SL-carrier #1 (with index #1), and SL resource pool #2 in SL-carrier #2 (with index #2) are configured and/or activated for SL CA operation for SL unicast communication between the SL UE #1 and SL UE #2. Then if resource (re)selection is triggered for data transmission in the SL UE #1 (921), the SL UE #1 sends inter-UE coordination REQ to the SL UE #2 (931). Note that the inter-UE coordination REQ is not sent in all configured and/or activated resource pools in multiple SL-carriers.

As illustrated in FIG. 9, the inter-UE coordination REQ is sent only in the SL resource pool #0 in the SL-carrier #0 (index #0) so it reduces the signaling overhead compared to the case multiple inter-UE coordination REQs that corresponds to each configured and/or activated resource pool in different SL-carriers are sent in separate.

In addition to the current information included in inter-UE coordination REQ, which was already described, the SL UE #1 also includes its requested number of SL-carriers (or number of SL resource pools). The information of the requested number of SL-carriers can be included as part of inter-UE coordination REQ. For example, reserved bits in the current inter-UE coordination REQ can be directly used for the information (e.g., any three reserved bits can indicate the requested number of SL-carriers up to 8). Or as another example, reserved bits in the current inter-UE coordination REQ can be used to indicate whether the information is added or not (e.g., "0" value indicates the information is not added and "1" value indicates the information is added) and if it indicates the information is added, the requested number of SL-carriers can be further included by either using the existing fields (or code-points) or adding the new fields (or code-points).

Or as another example, a new format of SCI and/or MAC CE can be designed to include both the current information of inter-UE coordination REQ and the requested number of SL-carriers. New MAC CE is indicated by new logical channel id in MAC sub-header.

Or as another example, a new format of SCI and/or MAC CE can be designed only include the requested number of SL-carriers. New MAC CE is indicated by new logical channel id in MAC sub-header. In this case, the current inter-UE coordination REQ and the new SCI format/MAC CE including the requested number of SL-carriers are multiplexed together in the same transport block (TB).

Or as another example, an existing SCI format that is used for other purposes than inter-UE coordination REQ can include the requested number of SL-carriers by using any reserved bits. For example, SCI format 1A that is used for the scheduling of PSSCH and 2nd-stage-SCI on PSSCH or SCI format 2A/2B that is used for the decoding of PSSCH possibly with HARQ operation can include the requested number of SL-carriers.

Note that current SCI format 1A and 2A/2B are specified as shown in below. SCI format 1-A is used for the scheduling of PSSCH and $2^{nd}$-stage-SCI on PSSCH The following information is transmitted by means of the SCI format 1-A: (1) priority—3 bits as specified in 3GPP standard specification. Value "000" of priority field corresponds to priority value "1," value "001" of priority field corresponds to priority value "2," and so on; (2) a frequency resource assignment $$-\left\lceil \log_2\left(\frac{N^{SL}_{subChannel}(N^{SL}_{subChannel}+1)}{2}\right)\right\rceil$$

bits when the value of the higher layer parameter sl-MaxNumPerReserve is configured to 2; otherwise $$\left\lceil \log_2\left(\frac{N^{SL}_{subChannel}(N^{SL}_{subChannel}+1)(2N^{SL}_{subChannel}+1)}{6}\right)\right\rceil$$

bits when the value of the higher layer parameter si-MaxNumPerReserve is configured to 3, as defined in 3GPP standard specification; (3) time resource assignment −5 bits when the value of the higher layer parameter sl-MaxNumPerReserve is configured to 2; otherwise, 9 bits when the value of the higher layer parameter sl-MaxNumPerReserve is configured to 3, as defined in 3GPP standard specification; (4) resource reservation period $-\lceil \log_2 N_{rsv\_period}\rceil$ bits as defined in 3GPP standard specification, where $N_{rsv\_period}$ is the number of entries in the higher layer parameter sl-ResourceReservePeriodList, if higher layer parameter sl-MultiReserveResource is configured; 0 bit otherwise; (5) DMRS pattern −▼ $\log_2 N_{pattern}\rceil$ bits as defined in 3GPP standard specification, where $N_{pattern}$ is the number of DMRS patterns configured by higher layer parameter sl-PSSCH-DMRS-TimePatternList; (6) $2^{nd}$-stage SCI format—2 bits as defined in 3GPP standard specification; (7) Beta_offset indicator—2 bits as provided by higher layer parameter sl-BetaOffsets2ndSCI and 3GPP standard specification; (8) a number of DMRS port—1 bit as defined in 3GPP standard specification; (9) modulation and coding scheme—5 bits as defined in 3GPP standard specification; (10) additional MCS table indicator—as defined in 3GPP standard specification: 1 bit if one MCS table is configured by higher layer parameter sl-Additional-MCS-Table; 2 bits if two MCS tables are configured by higher layer parameter sl-Additional-MCS-Table; 0 bit otherwise; (11) PSFCH overhead indication −1 bit as defined in 3GPP standard specification if higher layer parameter sl-PSFCH-Period=2 or 4; 0 bit otherwise; and (12) reserved—a number of bits as determined by higher layer parameter sl-NumReservedBits, with value set to zero.

TABLE 5 shows the $2^{nd}$-stage SCI format, TABLE 6 shows Beta_offset index, and TABLE 7 shows the antenna ports.

TABLE 5

| 2nd-stage SCI format | |
| --- | --- |
| Value of 2nd-stage SCI format field | 2nd-stage SCI format |
| 00 | SCI format 2-A |
| 01 | SCI format 2-B |
| 10 | SCI format 2-C |
| 11 | Reserved |

TABLE 6

| Beta_offset index | |
| --- | --- |
| Value of Beta_offset indicator | Beta_offset index in 3GPP standard specification |
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 7

| Antenna ports | |
| --- | --- |
| Value of the Number of DMRS port field | Antenna ports |
| 0 | 1000 |
| 1 | 1000 and 1001 |

SCI format 2-A is used for the decoding of PSSCH, with HARQ operation when HARQ-ACK information includes ACK or NACK, when HARQ-ACK information includes only NACK, or when there is no feedback of HARQ-ACK information. Note that the SCI format 2-A is specified as shown below. The following information is transmitted by means of the SCI format 2-A: (1) HARQ process number—4 bits; (2) a new data indicator—1 bit; (3) a redundancy version—2 bits as defined in 3GPP standard specification; (4) a source ID—8 bits as defined in 3GPP standard specification; (5) a destination ID—16 bits as defined in 3GPP standard specification; (6) a HARQ feedback enabled/disabled indicator—1 bit as defined in 3GPP standard specification; (7) a cast type indicator—2 bits as defined in 3GPP standard specification; and (8) a CSI request −1 bit as defined in 3GPP standard specification. TABLE 8 shows a cast type indicator.

TABLE 8

| Cast type indicator | |
| --- | --- |
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

SCI format 2-B is used for the decoding of PSSCH, with HARQ operation when HARQ-ACK information includes only NACK, or when there is no feedback of HARQ-ACK information.

The following information is transmitted by means of the SCI format 2-B: (1) HARQ process number—4 bits; (2) a new data indicator—1 bit; (3) a redundancy version –2 bits as defined in 3GPP standard specification; (4) a source ID—8 bits as defined in 3GPP standard specification; (5) a destination ID—16 bits as defined in 3GPP standard specification; (6) a HARQ feedback enabled/disabled indicator—1 bit as defined in 3GPP standard specification; (7) a Zone ID—12 bits as defined in 3GPP standard specification; and (8) communication range requirement—4 bits determined by higher layer parameter sl-ZoneConfigMCR-Index.

It may be assumed that the requested number of SL-carriers is "2" in 931 as illustrated in FIG. 9.

Once the SL UE #2 receives inter-UE coordination REQ in 931, the UE applies all received information to prepare inter-UE coordination information for the SL resource pool where inter-UE coordination REQ is sent/received (e.g., SL resource pool #0 in SL-carrier #0), and to prepare inter-UE coordination information for other candidate SL resource pools in different SL-carriers (e.g., SL resource pool #1 in SL-carrier #1 and SL resource pool #2 in SL-carrier #2), it applies the received RT and priority in common and derives RP, RSWL and/or a number of sub-channels based on {converting the received RP, RSWL and/or a number of sub-channels} and {SL resource pool configuration for each candidate} (941).

For example, RP and/or RSWL are generated based on SL logical slot which forms a corresponding SL resource pool, which specified in 3GPP standard specification. The SL UE #1 generates RP and/or RSWL based on the SL logical slot that forms SL resource pool #0 in SL-carrier #0 where inter-UE coordination REQ is sent. SL logical slot that forms other candidate SL resource pools, e.g., SL resource pool #1 in SL-carrier #1 and SL resource pool #2 in SL-carrier #2, can be different than the one in SL resource pool #0 in SL-carrier #0, so the SL UE #2 converts the received RP and/or RSWL to the ones for SL resource pool #1 in SL-carrier #1 and SL resource pool #2 in SL-carrier #2, e.g., converts the received RP and/or RSWL to SL physical slots, derive a corresponding physical time duration (e.g., X ms), and then derive the corresponding RP and/or RSWL for other candidate SL resource pools based on its own SL resource pool configuration.

For example, it may be assumed that 10 physical slots forms 1 physical sub-frame (assuming 1 ms sub-frame length) and SL resource pools are configured as follow: (1) SL resource pool #0 (SL-carrier #0) consists of 10 slots out of 10 (configured 10 slots are SL logical slots); (2) SL resource pool #1 (SL-carrier #1) consists of 5 slots out of 10 (configured 5 slots are SL logical slots); and (3) SL resource pool #2 (SL-carrier #2) consists of 1 slots out of 10 (configured 1 slot is SL logical slot).

If the received RP and/or RSWL in SL resource pool #0 (SL-carrier #0) indicates 10 (e.g., as the number of SL logical slots), the SL UE #2 derives physical time duration, 1 ms, based on SL resource pool #0 configuration and the received RP and/or RSWL (10 SL logical slots means one sub-frame in SL resource pool #0 in SL-carrier #0). Then the SL UE #2 derives RP and/or RSWL corresponding to SL resource pool #1 in SL-carrier #1 and SL resource pool #2 in SL-carrier #2.

In this example, RP and/or RSWL for SL resource pool #1 in SL-carrier #1 is 5 (5 SL logical slots are equal to one physical sub-frame, 1 ms) and RP and/or RSWL for SL resource pool #2 in SL-carrier #2 is 1 (1 SL logical slot is equal to one physical sub-frame, 1 ms). The example of SL resource pool configurations was simple for easy description. In some SL resource pool configurations, the SL UE #2 may not be able to derive RP and/or RSWL for other candidate SL resource pools, which has exactly same physical time duration as the one converted by the received RP and/or RSWL in SL resource pool where RP and/or RSWL (inter-UE coordination REQ) is sent/received.

In this case, the SL UE #2 derives RP and/or RSWL, which can make the nearest/closest physical time duration out of the ones which can make longer/bigger value than the physical time duration converted by the received RP and/or RSWL. As another example, the SL UE #2 derives RP and/or RSWL, which can make the nearest/closest physical time duration out of the ones which can make shorter/smaller value than the physical time duration converted by the received RP and/or RSWL. As another example, the SL UE #2 derives RP, which can make the nearest/closest physical time duration out of the ones which can make longer/bigger value than the physical time duration converted by the received RP while it derives RSWL, which can make the nearest/closest physical time duration out of the ones which can make shorter/smaller value than the physical time duration converted by the received RSWL.

For example, a number of sub-channels is generated based on a number of resource blocks (RBs) (or physical RBs (PRBs)) which forms a sub-channel in a corresponding SL resource pool and the number of bits to be sent. The SL UE #1 generates a number of sub-channels based on a number of RBs that forms SL resource pool #0 in SL-carrier #0 where inter-UE coordination REQ is sent. A number of RBs that forms other candidate SL resource pools, e.g., SL resource pool #1 in SL-carrier #1 and SL resource pool #2 in SL-carrier #2, can be different than the one in SL resource pool #0 in SL-carrier #0, so for other candidate SL resource pools, the SL UE #2 converts the received number of sub-channels to a number of RBs and derives the number of sub-channels based on the number of RBs and its own SL resource pool configuration (a number of RBs that forms a sub-channel in the corresponding SL resource pool configuration).

For example, it may be assumed that 10 physical slots forms 1 physical sub-frame (assuming 1 ms sub-frame length) and SL resource pools are configured as follow: (1) SL resource pool #0 (SL-carrier #0): a sub-channel consists of 1 RB; (2) SL resource pool #1 (SL-carrier #1): a sub-channel consists of 5 RBs; and (3) SL resource pool #2 (SL-carrier #2): a sub-channel consists of 10 RBs.

If the received number of sub-channels in SL resource pool #0 (SL-carrier #0) indicates 10, the SL UE #2 applies 10 sub-channels to prepare inter-UE coordination information for SL resource pool #0 (SL-carrier #0). For other candidate SL resource pools, the SL UE #2 converts 10 sub-channels into 10 RBs (since 1 sub-channel is equal to 1 RB in SL resource pool #0 in SL-carrier #0) and derives 2 as a number of sub-channels for SL resource pool #1 in SL-carrier #1 (since 2 sub-channels are equal to 10 RBs in SL resource pool #1 in SL-carrier #1) and 1 as a number of sub-channels for SL resource pool #2 in SL-carrier #2 (since 1 sub-channel is equal to 10 RBs in SL resource pool #2 in SL-carrier #2). The SL UE #2 applies 2 sub-channels to prepare inter-UE coordination information for SL resource pool #1 in SL-carrier #1 and 1 sub-channel to prepare inter-UE coordination information for SL resource pool #2 in SL-carrier #2.

The example of SL resource pool configurations was simple for easy description. In some SL resource pool configurations, the SL UE #2 may not be able to derive a number of sub-channels for other candidate SL resource pools, which has exactly same number of RBs as the one converted by the received number of sub-channels in SL resource pool where a number of sub-channel (inter-UE coordination REQ) is sent/received.

In this case, the SL UE #2 derives a number of sub-channels, which can make the nearest/closest number of RBs out of the ones which can make longer/bigger value than the number of RBs converted by the received number of sub-channels. As another example, the SL UE #2 derives a number of sub-channels, which can make the nearest/closest number of RBs out of the ones which can make shorter/smaller value than the number of RBs converted by the received number of sub-channels.

Once the SL UE #2 receives 931 inter-UE coordination REQ and derives all necessary information for other candidate SL resource pools in different SL-carriers, it generates inter-UE coordination information for each candidate SL-resource pool (SL resource pool #0 in SL-carrier #0, SL resource pool #1 in SL-carrier #1, and SL resource pool #2 in SL-carrier #2) based on its own sensing operation (951). Since it is assumed the requested number of SL-carriers in 931 is "2," the SL UE #2 selects 2 best candidate SL resource pools and SL-carriers out of all candidate SL resource pools and SL-carriers (961).

For example, the SL UE #2 can select the candidate resource pools in the order of the SL resource pools that has a greater number of preferred resources in the corresponding inter-UE coordination information. As another example, the SL UE #2 can select the candidate resource pools in the order of the SL resource pools that has a smaller number of non-preferred resources in the corresponding inter-UE coordination information. As another example, the SL UE #2 can select the candidate resource pools in the order of the SL resource pools that has smaller measured channel busy ratio (CBR).

It may be assumed that the SL UE #2 selects SL resource pool #0 in SL-carrier #0 and SL resource pool #2 in SL-carrier #2 in 1261. Then the SL UE #2 sends each corresponding inter-UE coordination information in SL resource pool #0 in SL-carrier #0 and SL resource pool #2 in SL-carrier #2 (971, 973).

Note that, in the figure, although it is assumed the SL UE #2 performs 961 after 951, as another example the SL UE #2 can perform 961 before 951. In this case, the SL UE #2 first selects 2 best candidate SL resource pools and SL-carriers out of all candidate SL resource pools and SL carriers (e.g., based on the measured CBR value), then it generates inter-UE coordination information only for the selected SL resource pools and SL-carriers.

Note that, in the figure, although it is assumed inter-UE coordination information for each SL resource pool is sent in separate, as another example single inter-UE coordination information including both information in 971 and 973 can be sent. In this case, new SCI format or MAC CE format is used to include multiple inter-UE coordination information with index information. This single inter-UE coordination information can be sent either in single SL resource pool in a SL-carrier or in multiple SL resource pools in different SL-carriers.

Once the SL UE #1 receives 971 and 973 inter-UE coordination information from the SL UE #2, it finally (re)selects the resources for data transmissions, taking the received information in 971 and 1273 into account (981), and transmits data in the selected resources in multiple SL-carriers (assuming the SL UE #1 (re)selects the resources in multiple SL resource pools in different SL-carriers) (991, 993).

In the figure although it is assumed requested number of SL-carriers is transmitted in 931, as another example list of index can be transmitted. For example, it is assumed SL resource pool #0 in SL-carrier #0 is configured with index #0, SL resource pool #1 in SL-carrier #1 is configured with index #1 and SL resource pool #2 in SL-carrier #2 is configured with index #2 in 911, then if the SL UE #1 transmits index #0 and index #2 as list of index information in 931, the SL UE #2 only considers SL resource pool #0 in SL-carrier #0 (indicated by index #0) and SL resource pool #2 in SL-carrier #2 (indicated by index #2) for inter-UE coordination information.

Then for inter-UE coordination information for SL resource pool #0 in SL-carrier #0, the SL UE #2 applies the received RT, priority, RP, RSWL and a number of sub-channels from 931 and for inter-UE coordination information for SL resource #2 in SL-carrier #2, the SL UE #2 applies the received RT and priority from 931 and derives RP, RSWL and/or a number of sub-channels based on {converting the received RP, RSWL and/or a number of sub-channels} and {SL resource pool configuration for each candidate}, which already described in the figure.

As another example, 1-bit indicator for all candidate SL resource pools and SL-carriers can be transmitted. If the SL UE #1 includes 1-bit indicator with "1" (or "true") in 931, the SL UE #2 considers all candidate SL resource pools in different SL-carriers for inter-UE coordination information. In the provided example, the SL UE #2 applies the received RT, priority, RP, RSWL and a number of sub-channels from 931 for SL resource pool #0 in SL-carrier #0 and for all other candidate SL resource pools in different SL-carriers (SL resource pool #1 in SL-carrier #1 and SL resource pool #2 in SL-carrier #2), it applies the received RT and priority from 931 and derives RP, RSWL and/or a number of sub-channels based on {converting the received RP, RSWL and/or a number of sub-channels} and {SL resource pool configuration for each candidate}, which already described in the figure.

Note that, in this case, the selection procedure in 961 is not needed. As another example, a scaling factor can be transmitted. If the SL UE #1 includes a scaling factor Y in 931, the SL UE #2 converts the received number of sub-channels to a number of RBs based on the configuration of SL resource pool #0 in SL-carrier #0, where inter-UE coordination REQ is sent/received, calculates {Y*converted number of RBs}, then selects the best candidate SL resource pool and SL-carrier until it can include inter-UE coordination information up to {Y*converted number of RBs}. It may be assumed that the SL UE #1 transmits "0.5" as a scaling factor and "10" as a number of sub-channels.

In one example, since a sub-channel consists of 1 RB in SL resource pool #0 in SL-carrier #0, the SL UE #2 calculates {0.5*(10*1)}=5, which means the SL UE #2 needs to generate inter-UE coordination information in other candidate SL resource pools (SL resource pool #1 in SL-carrier #1 and/or SL resource pool #2 in SL-carrier #2) to handle additional 5 RBs. Then in addition to SL resource pool #0 in SL-carrier #0, the SL UE #2 can also consider SL resource pool #1 in SL-carrier #1 for inter-UE coordination information with a number of sub-channel "1" since one sub-channel in SL resource pool #1 in SL-carrier #1 corresponds to 5 RBs. A scaling factor is used to determine the amount of additional RBs on top of RBs that is converted by the number of sub-channel in inter-UE coordination REQ.

As another example, a scaling factor is used to determine the total amount of RBs including RBs that is converted by the number of sub-channel in inter-UE coordination REQ, e.g., if a scaling factor is "2," {2*converted number of RBs} is total number of RBs the SL UE #1 requests including SL resource pool #0 in SL-carrier #0. It is up to the SL UE #2 to determine how many number of sub-channels is/are considered for each SL resource pool in different SL-carrier as long as the total number of sub-channels covers {2*converted number of RBs}.

As another example, a scaling factor is used to determine either the amount of additional sub-channels on top of number of sub-channels in inter-UE coordination REQ or the total amount of sub-channels. The difference compared to the previous examples is for example, if a scaling factor "0.5" or "2," then the scaling factor is applied before converting a number of sub-channels to a number of RBs, e.g., {0.5*a number of sub-channels} or {2*a number of sub-channels}, then it is converted to the number of RBs.

As another example, SL buffer status (BS) can be transmitted. Then the SL UE #2 uses the received SL BS information to determine a number of sub-channels for additional SL resource pool(s) than SL-resource pool #0 in SL-carrier #0 where inter-UE coordination REQ is sent/received. For example, if SL BS is "Y" and the SL UE #2 can generate inter-UE coordination information with a number of sub-channels "N" for SL resource pool #0 in SL-carrier #0 and with a number of sub-channels "M" for SL resource pool #1 in SL-carrier #1 as long as total resources by "N" and "M" sub-channels can handle the amount of bits indicated by "Y."

As another example, no additional information (even without requested number of SL carriers) is transmitted in 931. Instead, whether inter-UE coordination information only applies to SL resource pool where inter-UE coordination REQ is sent/received (it is called as configuration #1) or whether inter-UE coordination information applies to all candidate SL resource pools (in addition to SL resource pool where inter-UE coordination REQ is sent/received) (it is called as configuration #2) is configured in 911.

If configuration #1 is configured in 911, the SL UE #2 considers only the SL resource pool where inter-UE coordination REQ is received for inter-UE coordination information, and it applies the received information from 931 as it is. If configuration #2 is configured in 911, the SL UE #2 considers all candidate SL resource pools (e.g., SL resource pool #0 in SL-carrier #0, SL resource pool #1 in SL-carrier #1, and SL resource pool #2 in SL-carrier #2) for inter-UE coordination information, and it applies the received information from 931 as it is for the SL resource pool where inter-UE coordination REQ is received and for other candidate SL resource pools, it applies the received RT and priority from 931 and derive RP, RSWL and/or a number of sub-channels based on {converting the received RP, RSWL and/or a number of sub-channels} and {SL resource pool configuration for each candidate}.

Note that configuration #1 and configuration #2 can be either explicitly configured or implicitly configured in 911. As implicit configuration, configuration #2 if SL CA is configured in 911 otherwise configuration #1.

Figure 10A:
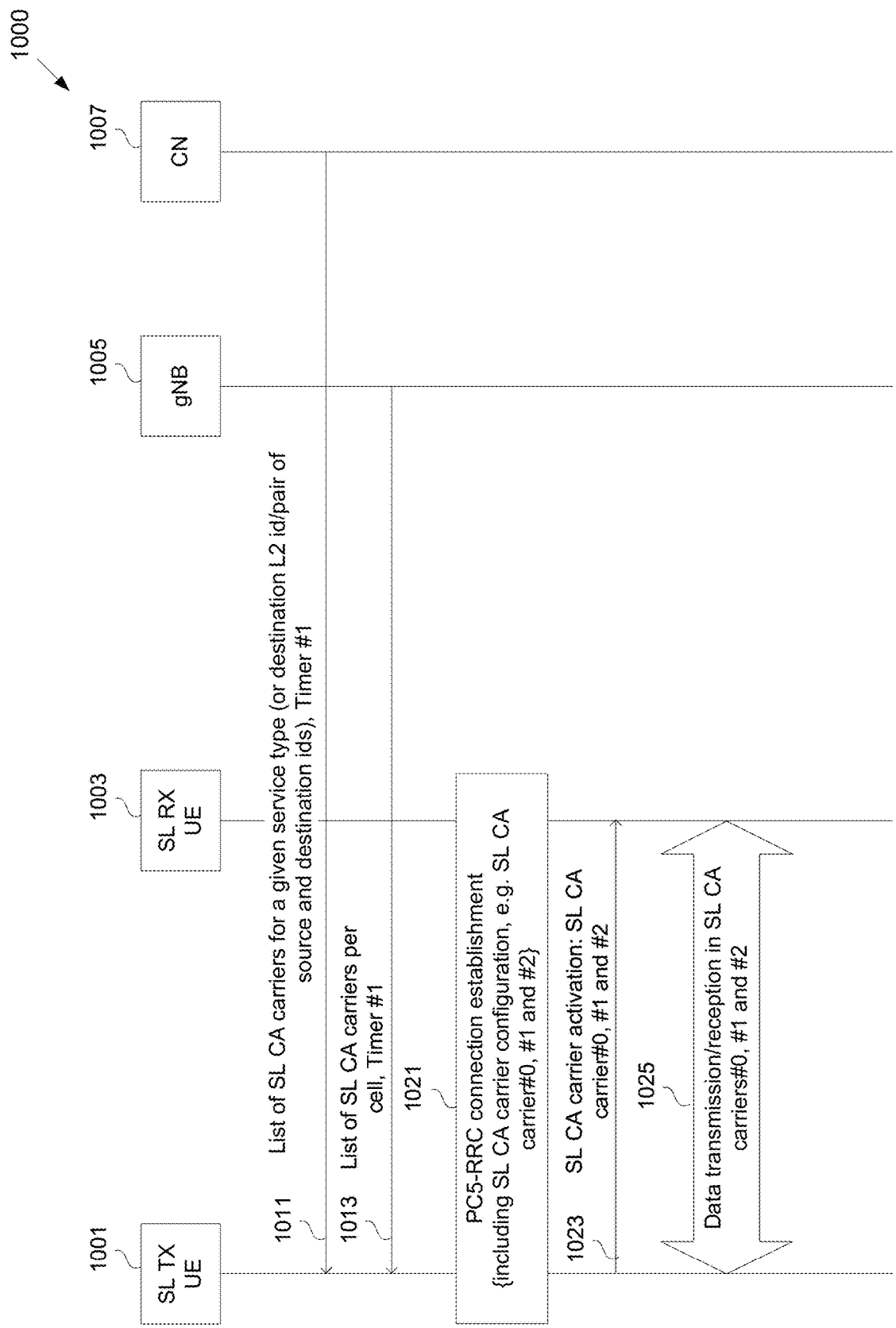
FIGS. 10A and 10B illustrate signaling flows for efficient SL carrier activation/configuration in SL CA according to embodiments of the present disclosure.
Figure 10B:
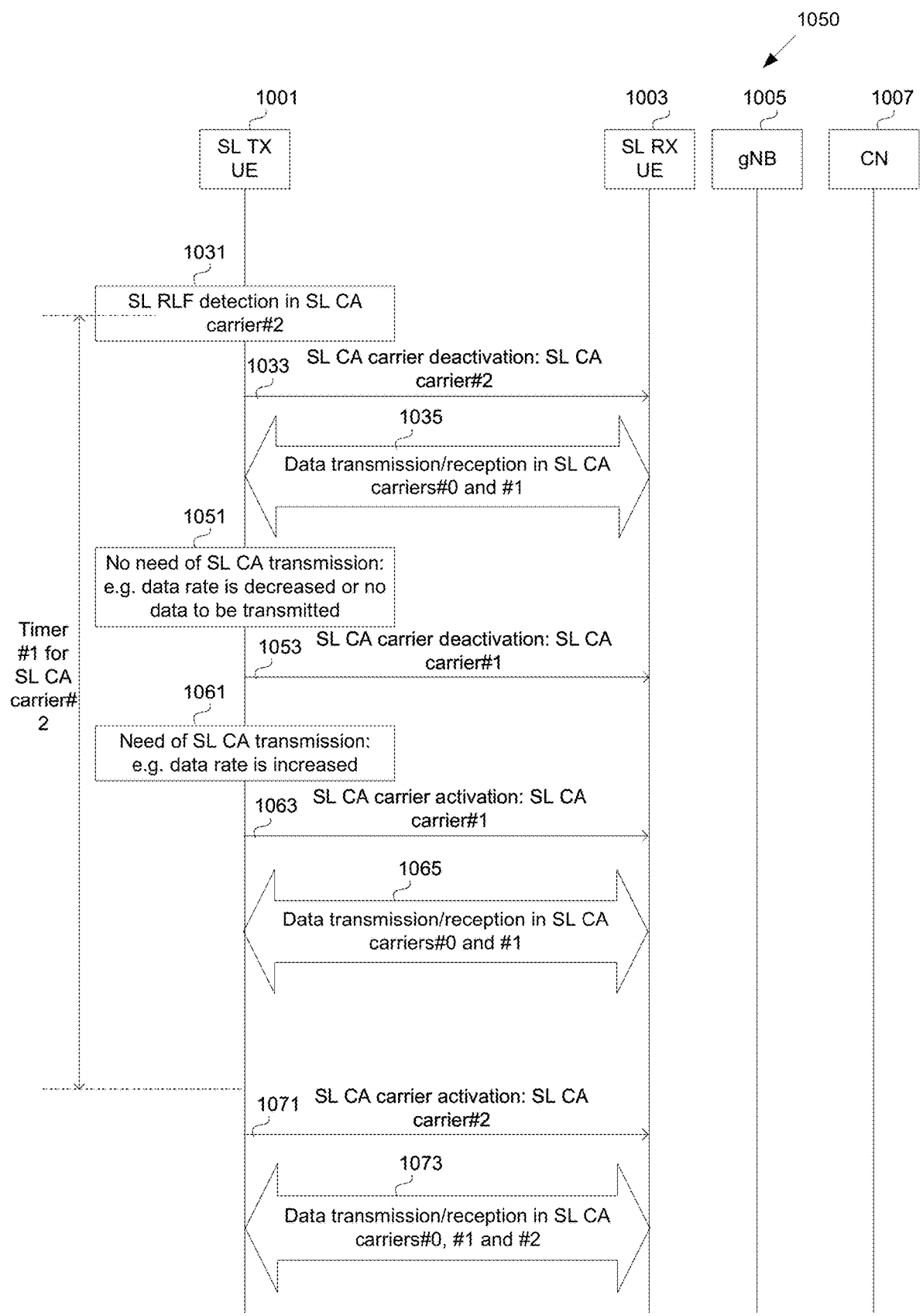

FIGS. 10A and 10B illustrate signaling flows 1000 and 1050 for efficient SL carrier activation/configuration in SL CA according to embodiments of the present disclosure. The methods 1000 and 1050 1400 as may be performed by a UE (e.g., 111-116 as illustrated in FIG. 1) and a BS (e.g., 101-103 as illustrated in FIG. 1). An embodiment of the methods 1000 and 1050 shown in FIGS. 10A and 10B is for illustration only. One or more of the components illustrated in FIGS. 10A and 10B can be implemented in specialized circuitry configured to perform the noted functions or one or more of the components can be implemented by one or more processors executing instructions to perform the noted functions. Note that FIG. 10A and FIG. 10B are connected together.

In one embodiment, an efficient SL carrier activation/configuration in SL CA is provided. FIGS. 10A and 10B describe one example of embodiments for the efficient SL carrier activation/configuration in SL CA. An SL UE (1001) is configured for an SL transmission, a peer SL UE (1003) is configured for SL reception, a serving gNB (1005) of the SL UE (1001), and a core network (CN, 1007) entity that is responsible for SL pre-configuration of the SL UE (1001). The CN (1007) pre-configures a list of SL carriers for a given service type (or a L2 destination id/a pair of source and destination ids) and timer #1 value to the SL UE (1001) in 1011.

Note that the CN (1007) can also pre-configure the list of SL carriers for a given service type (or L2 destination id/a pair of source and destination ids) and timer #1 value to the SL UE (1003). The gNB (1005) configures available list of SL CA carriers in the serving cell (or list of SL CA carriers per QoS(s) in the serving cell) and timer #1 value to the SL UE (1001) in 1013.

For timer #1 value, if the SL UE (1001) is located out of the gNB coverage, the UE applies pre-configuration from 1011, otherwise if the UE is located in the serving cell of the gNB, the UE applies configuration from 1013. For candidate SL CA carriers, if the SL UE (1001) is located out of the gNB coverage, the UE applies pre-configuration from 1011 according to the SL UE's interested service type (or a L2 destination id/a pair of source and destination ids) possibly with some restriction based on the SL UE location (e.g., some SL CA carriers are not valid to the SL UE location).

If the SL UE is located in the serving cell of the gNB, the SL UE applies SL CA carriers that can be supported from both 1011 to the SL UE's interested service type (or a L2 destination id/a pair of source and destination ids) and 1013 to the SL UE's serving cell. 1013 can be signaled by either a system information block or a UE dedicated RRC message. One example of the UE dedicated RRC message is RRCReconfiguration message defined in 3GPP standard specification.

If the SL UE (1001) is interested in SL Unicast (UC) communication with the SL UE (1003), a PC5-RRC connection establishment procedure is performed between the SL UE (1001) and the SL UE (1003) in 1021. During PC5-RRC connection establishment, candidate SL CA carriers can be further configured between the two SL UEs, e.g., some of SL CA carriers among the candidate SL CA carriers from 1011 and/or 1013 can be further configured between the two SL UEs.

It may be assumed that SL CA carrier #0, SL CA carrier #1, and SL CA carrier #2 are configured in 1021. Note SL CA carriers can be also reconfigured by a separate SL RRC reconfiguration procedure after PC5-RRC connection is established. The SL UE (1001) can activate or deactivate all or some of SL CA carriers among the SL CA carriers configured in 1021 by SL CA carrier activation or SL CA carrier deactivation control information (1023). This control information can be transmitted by either SL MAC CE or L1 SL control information (SCI).

It may be assumed that all of SL CA carrier #0, SL CA carrier #1, and SL CA carrier #2 are activated in 1023. Then the SL UE (1001) can transmit control and/or data in SL CA carrier #0, SL CA carrier #1 and SL CA carrier #2 and the UE (1003) can receive them in SL CA carrier #0, SL CA carrier #1 and SL CA carrier #2 (1025). The SL UE (1001) may detect SL RLF in a SL CA carrier, e.g., The SL UE (1001) detects SL RLF based on HARQ feedback in SL CA carrier #2 (1031). Then the SL UE (1001) starts Timer #1 for SL CA carrier #2 and excludes SL CA carrier #2 from the candidate SL CA carriers for SL CA carrier activation while the Timer #1 runs.

Once the SL UE (1001) detects HARQ-based SL RLF in SL CA carrier #2, the SL UE transmits SL CA carrier #2 deactivation/release to the SL UE (1003) in 1033. The SL UE (1003) may stop monitoring of SL control channel and/or data channel in SL CA carrier #2. Once SL CA carrier #2 is deactivated/released, the SL UE (1001) transmits control and/or data only in SL CA carrier #0 and SL CA carrier #1 (1035).

It may be assumed that the SL UE (1001) decides to decrease the number of SL CA carriers for control and/or data transmission for a while, for example if amount of data to be transmitted (or data rate) is decreased or if there is no more data to be transmitted (1051), so the SL UE (1001) deactivates SL CA carrier #1 also (1053). Then later, the SL UE (1001) decides to increase the number of SL CA carriers for control and/or data transmission, for example if amount of data to be transmitted (or data rate) is increased (1061).

Since the timer #1 for SL CA carrier #2 still runs at the time, the SL UE (1001) still excludes SL CA carrier #2 from the candidate SL CA carriers for SL CA carrier activation. Thus, the SL UE (1001) only can activate SL CA carrier #1 (1063) and transmit control and/or data in SL CA carrier #0 and SL CA carrier #1 (1065). If the Timer #1 for SL CA carrier #2 expires, then the SL UE (1001) can also activate/reconfigure SL CA carrier #2 (1071) and transmit control and/or data in SL CA carrier #2 in addition to SL CA carrier #0 and SL CA carrier #1 (1073). Without the exclusion of SL CA carrier while the corresponding Timer #1 runs, if the SL UE (1001) activate the SL CA carrier, where SL RLF was detected, immediately (or in short time after SL RLF was detected), it may be high chance the bad radio condition still remains so the transmitting control and/or data in the SL CA carrier may fail.

Note in the figure, it is assumed that both SL CA carrier(s) configuration (1021) and activation/deactivation for the configured SL CA carrier(s) (1023, 1033, 1053, 1063, and 1071) are used. As another example, SL CA carrier(s) configuration alone can be used. If SL CA carrier(s) is/are added in 1021 (or in the following PC5-RRC reconfiguration procedure), it means all the added SL CA carrier(s) are configured and activated without separate SL CA carrier activation signal, and if SL CA carrier(s) is/are released in 1021 (or in the following PC5-RRC reconfiguration procedure), it means all the released SL CA carrier(s) are deactivated without separate SL CA carrier deactivation signal and released.

In this case, the SL UE (1001) excludes SL CA carrier #2 from the candidate SL CA carriers for SL CA carrier addition in SL CA carrier(s) (re)configuration while the corresponding timer #1 runs. Once the timer #1 expires, the SL UE can add SL CA carrier #2 in SL CA carrier(s) (re)configuration. Also note for SL group communication (GC) and broadcast communication (BC), there is no SL CA carrier(s) (re) configuration between involved UEs (or member UEs who belong to the group/corresponding L2 destination id) by PC5-RRC like 1021.

For SL GC and BC, the SL UE (1001) selects one of multiple SL CA carriers among the SL CA carriers from 1011 and/or 1013 then the SL UE transmits control and/or data in the selected SL CA carrier(s). In this case, the SL UE (1001) excludes SL CA carrier #2 from the candidate SL CA carriers for SL CA carrier selection while the corresponding timer #1 runs. Once the timer #1 expires, the SL UE can select SL CA carrier #2 for SL GC and/or BC transmission.

Note that, in as illustrated in FIG. 10, a timer #1 for SL CA carrier #2 and the corresponding UE behavior to the timer #1 may not be applied when the UE detects SL RLF based on other criteria/conditions (other than HARQ-based SL RLF in SL CA carrier #2), for example, if the UE detects SL RLF based on the following criteria/conditions (as illustrated in 3GPP standard specification) as shown in TABLE 9.

TABLE 9

SL RLF detection criteria/conditions

1> upon indication from sidelink RLC entity that the maximum number of retransmissions for a specific destination has been reached; or
1> upon T400 expiry for a specific destination; or
1> upon integrity check failure indication from sidelink PDCP entity concerning SL-SRB2 or SL-SRB3 for a specific destination.

Also note that the UE can trigger SL carrier selection procedure for a new SL CA carrier when the UE detects HARQ-based SL RLF in SL CA carrier #2, for example, to select a new SL carrier among SL carrier #3, #4, and #5 to replace implicitly deactivated/released SL CA carrier #2.

Figure 11:
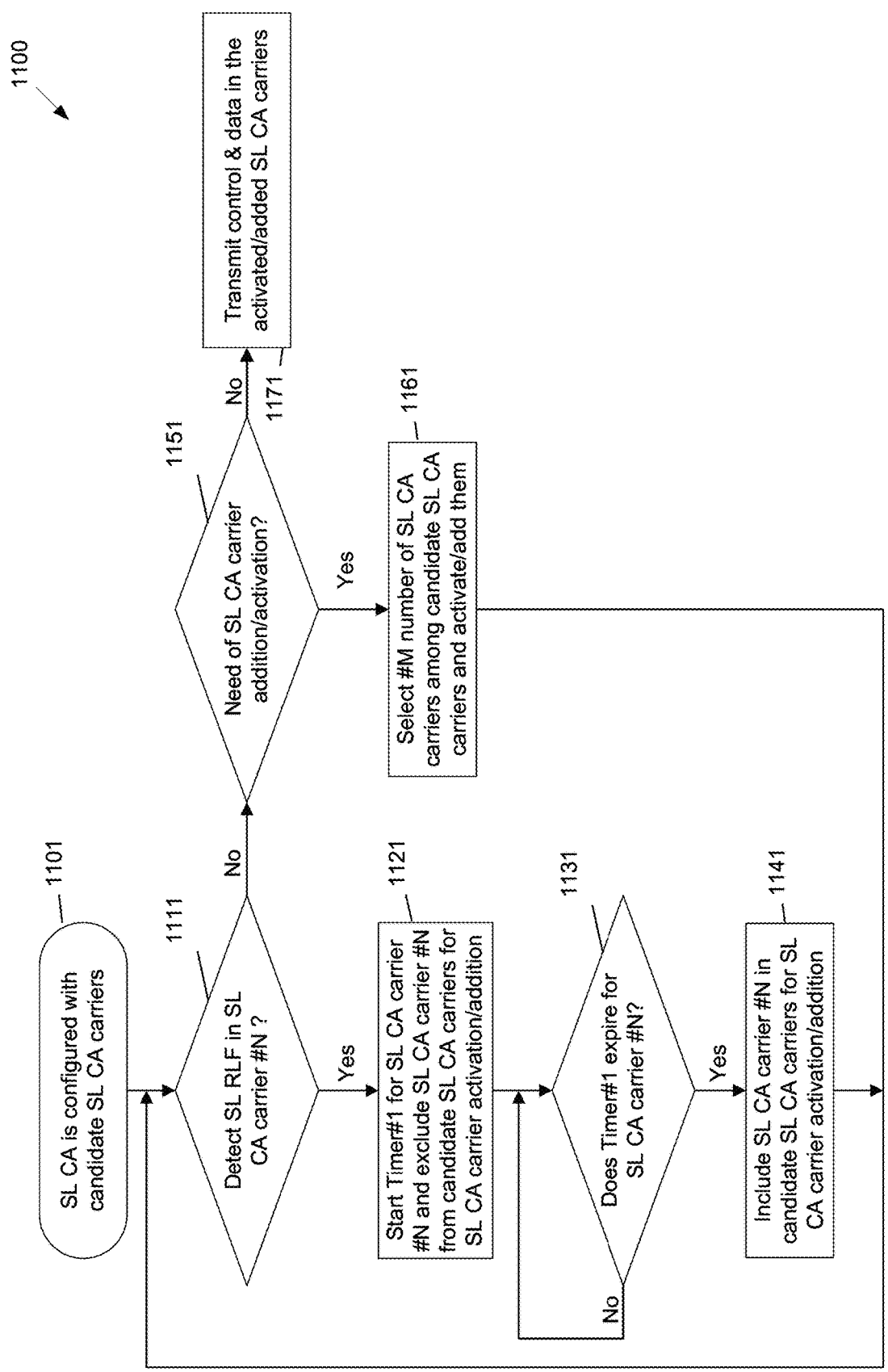
FIG. 11 illustrates a flowchart of method for a UE according to embodiments of the present disclosure.

FIG. 11 illustrates a flowchart of method 1100 for a UE according to embodiments of the present disclosure. The method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

FIG. 11 describes one example of UE operation flow chart according to the embodiment. It may be assumed that a SL UE is configured for SL transmission and the SL UE is configured with candidate SL CA carriers (1101). The SL UE checks if SL RLF is detected in SL CA carrier #N (where #N means one of the configured SL CA carriers in 1111. For example, the SL UE detects SL RLF based on HARQ feedback in SL CA carrier #N. If SL RLF is detected in SL CA carrier #N, the SL UE starts timer #1 (with configured or pre-configured value) for SL CA carrier #N and excludes this SL CA carrier #N from the candidate SL CA carriers for SL CA carrier activation/addition (1121). Then if the timer #1 expires for SL CA carrier #N (1131), the SL UE includes this SL CA carrier #N into the candidate SL CA carriers for SL CA carrier activation/addition (1141).

When the SL UE needs to activate/add SL CA carrier(s) for SL control and/or data transmission (1151), the SL UE selects one or multiple (up to #M numbers, where M integer value larger than 0) SL carriers among the candidate SL CA carriers and activate/add them (1161). Note in 1161, the SL UE does not consider the excluded SL CA carrier #N from 1121 unless the corresponding Timer #1 expires. Once SL CA carrier(s) is/are activated/added, the SL UE can transmit control and/or data in the activated/added SL CA carriers (1171).

Figure 12:
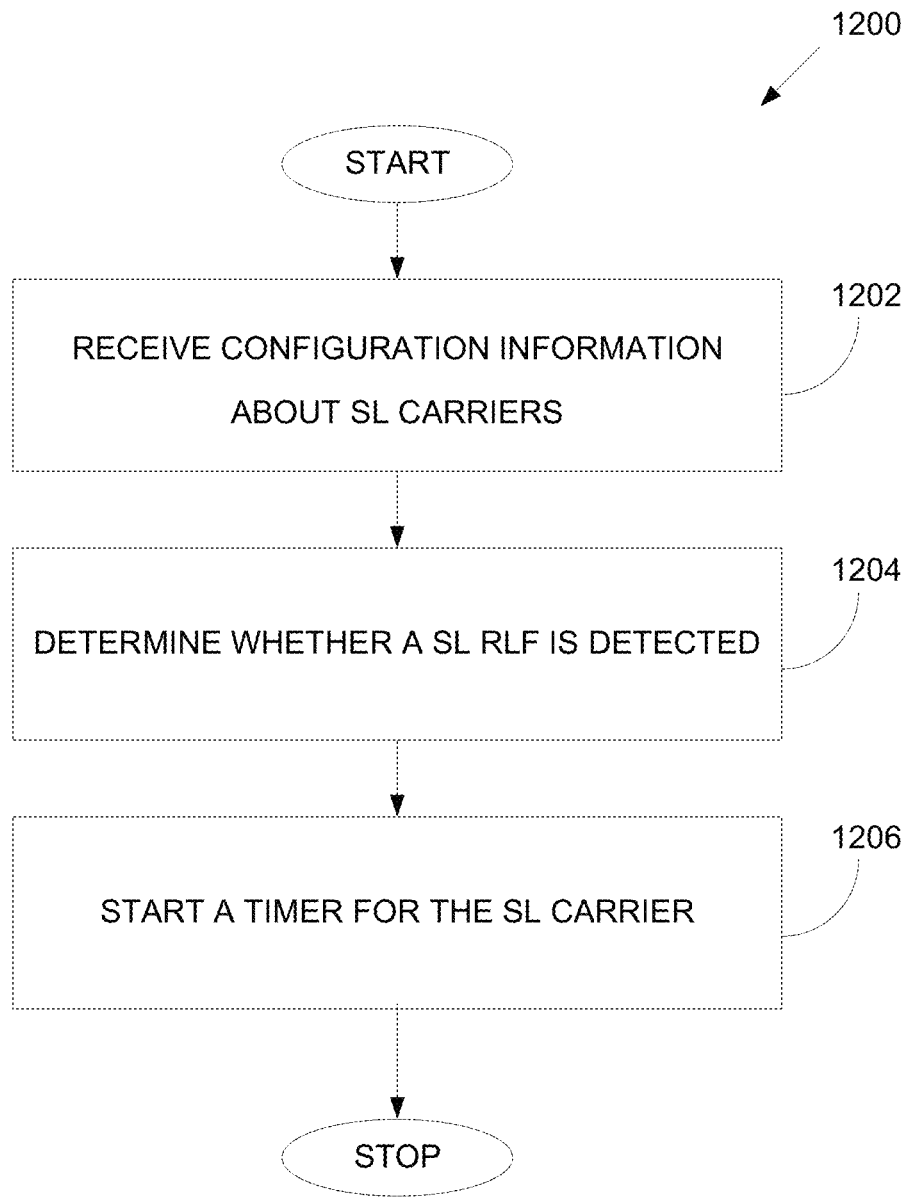
FIG. 12 illustrates a flowchart of a method for a HARQ-based SL RLF detection in an SL CA according to embodiments of the present disclosure.

FIG. 12 illustrates a flowchart of a method 1200 for a HARQ-based SL RLF detection in an SL CA according to embodiments of the present disclosure. The method 1200 as may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at 1202. In step 1202, the UE receives, from a BS, configuration information about multiple SL carriers for a SL CA operation.

In step 1204, subsequently, the UE determines whether a SL RLF is detected for a SL carrier among the multiple SL carriers. Finally, in step 1206, the UE starts a timer for the SL carrier based on a determination that the SL RLF is detected, wherein an activation or a deactivation of the SL carrier is determined based on a status of the timer.

In one embodiment, the UE receives, via a UE dedicated RRC message or system information, information about the multiple SL carriers and the timer, or identifies the multiple SL carriers and the timer based on predetermined parameters.

In one embodiment, the UE identifies the multiple SL carriers based on a destination L2 ID.

In one embodiment, the UE identifies the multiple SL carriers based on a set of parameters associated with a required QoS.

In one embodiment, the UE receives a value for a threshold number of consecutive HARQ DTX; and detects the SL RLF of the SL carrier based on a comparison between an actual number of consecutive HARQ DTX and the threshold number of consecutive HARQ DTX.

In one embodiment, the UE transmits, to a peer UE via a PC5-RRC message or a SL MAC CE, a SL carrier deactivation signal or a SL carrier release signal for the SL carrier.

In one embodiment, the UE determines the status of the timer, determines that the SL carrier is activated or configured, based on a determination that the status of the timer is not running, determines that the SL carrier is deactivated or released based on a determination that the status of the timer is running, maintains a PC5-RRC connection based on a determination that at least one SL carrier among the multiple SL carriers is activated or configured, and release the PC5-RRC connection based on a determination that each SL carrier among the multiple SL carriers is released or deactivated.

In one embodiment, the UE does not start the timer for the SL carrier when the SL RLF is detected based on at least one of: a maximum number of RLC retransmissions, expiry of timer 400 (T400), or an integrity check failure for a destination L2 ID.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, from a base station (BS), configuration information about multiple sidelink (SL) carriers for a SL carrier aggregation (CA) operation; and
a processor operably coupled to the transceiver, the processor configured to:
determine whether a SL radio link failure (RLF) is detected for a SL carrier among the multiple SL carriers, and
start a timer for the SL carrier based on a determination that the SL RLF is detected, wherein an activation or a deactivation of the SL carrier is determined based on a status of the timer.

2. The UE of claim 1, wherein:
the transceiver is further configured to receive, via a UE dedicated radio resource control (RRC) message or system information, information about the multiple SL carriers and the timer, or
the processor is further configured to identify the multiple SL carriers and the timer based on predetermined parameters.

3. The UE of claim 1, wherein the processor is further configured to identify the multiple SL carriers based on a destination layer 2 (L2) identification (ID).

4. The UE of claim 1, wherein the processor is further configured to identify the multiple SL carriers based on a set of parameters associated with a required quality of service (QoS).

5. The UE of claim 1, wherein:
the transceiver is further configured to receive a value for a threshold number of consecutive hybrid automatic repeat request (HARQ) discontinuous transmission (DTX); and
the processor is further configured to detect the SL RLF of the SL carrier based on a comparison between an actual number of consecutive HARQ DTX and the threshold number of consecutive HARQ DTX.

6. The UE of claim 1, wherein the transceiver is further configured to transmit, to a peer UE via a PC5-RRC message or a SL medium access control control element (MAC CE), a SL carrier deactivation signal or a SL carrier release signal for the SL carrier.

7. The UE of claim 1, wherein the processor is further configured to:
determine the status of the timer;
determine that the SL carrier is activated or configured based on a determination that the status of the timer is not running;
determine that the SL carrier is deactivated or released based on a determination that the status of the timer is running;
maintain a PC5-RRC connection based on a determination that at least one SL carrier among the multiple SL carriers is activated or configured; and release the PC5-RRC connection based on a determination that each SL carrier among the multiple SL carriers is released or deactivated.

8. The UE of claim 1, wherein the processor is further configured to not start the timer for the SL carrier when the SL RLF is detected based on at least one of:
a maximum number of radio link control (RLC) retransmissions;
expiry of timer 400 (T400); or
an integrity check failure for a destination layer 2 (L2) identification (ID).

9. A method of a user equipment (UE), the method comprising:
receiving, from a base station (BS), configuration information about multiple sidelink (SL) carriers for a SL carrier aggregation (CA) operation;
determining whether a SL radio link failure (RLF) is detected for a SL carrier among the multiple SL carriers; and
starting a timer for the SL carrier based on a determination that the SL RLF is detected, wherein an activation or a deactivation of the SL carrier is determined based on a status of the timer.

10. The method of claim 9, further comprising:
receiving, via a UE dedicated radio resource control (RRC) message or system information, information about the multiple SL carriers and the timer, or
identifying the multiple SL carriers and the timer based on predetermined parameters.

11. The method of claim 9, further comprising identifying the multiple SL carriers based on a destination layer 2 (L2) identification (ID).

12. The method of claim 9, further comprising identifying the multiple SL carriers based on a set of parameters associated with a required quality of service (QoS).

13. The method of claim 9, further comprising:
receiving a value for a threshold number of consecutive hybrid automatic repeat request (HARQ) discontinuous transmission (DTX); and
detecting the SL RLF of the SL carrier based on a comparison between an actual number of consecutive HARQ DTX and the threshold number of consecutive HARQ DTX.

14. The method of claim 9, further comprising transmitting, to a peer UE via a PC5-RRC message or a SL medium access control control element (MAC CE), a SL carrier deactivation signal or a SL carrier release signal for the SL carrier.

15. The method of claim 9, further comprising:
determining the status of the timer;
determining that the SL carrier is activated or configured, based on a determination that the status of the timer is not running;
determining that the SL carrier is deactivated or released based on a determination that the status of the timer is running;
maintaining a PC5-RRC connection based on a determination that at least one SL carrier among the multiple SL carriers is activated or configured; and
releasing the PC5-RRC connection based on a determination that each SL carrier among the multiple SL carriers is released or deactivated.

16. The method of claim 9, further comprising not starting the timer for the SL carrier when the SL RLF is detected based on at least one of:
a maximum number of radio link control (RLC) retransmissions;
expiry of timer 400 (T400); or
an integrity check failure for a destination layer 2 (L2) identification (ID).

17. A base station (BS) comprising:
a processor configured to generate configuration information about multiple sidelink (SL) carriers; and
a transceiver operably coupled to the processor, the transceiver configured to transmit, to a use equipment (UE), the configuration information about the multiple SL carriers for a SL carrier aggregation (CA) operation, wherein:
a detection of SL radio link failure (RLF) is determined based on the configuration information, for a SL carrier among the multiple SL carriers, and
a timer for the SL carrier is started based on a determination when the SL RLF is detected, wherein an activation or a deactivation of the SL carrier being determined based on a status of the timer.

18. The BS of claim 17, wherein the transceiver is further configured to transmit, via a UE dedicated radio resource control (RRC) message or system information, information about the multiple SL carriers and the timer.

19. The BS of claim 17, wherein:
the transceiver is further configured to transmit a value for a threshold number of consecutive hybrid automatic repeat request (HARQ) discontinuous transmission (DTX); and
the SL RLF of the SL carrier is detected based on a comparison between an actual number of consecutive HARQ DTX and the threshold number of consecutive HARQ DTX.

20. The BS of claim 17, wherein:
the multiple SL carriers are identified based on a destination layer 2 (L2) identification (ID) or
the multiple SL carriers are determined based on a set of parameters associated with a required quality of service (QoS).

* * * * *